US009866861B2

(12) United States Patent
Park et al.

(10) Patent No.: US 9,866,861 B2
(45) Date of Patent: *Jan. 9, 2018

(54) METHOD FOR ENCODING AND DECODING IMAGE AND DEVICE USING SAME

(75) Inventors: Joonyoung Park, Seoul (KR); Sangchul Kim, Seoul (KR); Seungwook Park, Seoul (KR); Jaehyun Lim, Seoul (KR); Yongjoon Jeon, Seoul (KR); Byeongmoon Jeon, Seoul (KR); Younghee Choi, Seoul (KR); Jaewon Sung, Seoul (KR); Jungsun Kim, Seoul (KR); Jingyeong Kim, Seoul (KR); Taeil Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/814,751

(22) PCT Filed: Feb. 9, 2012

(86) PCT No.: PCT/KR2012/000959
§ 371 (c)(1),
(2), (4) Date: Feb. 7, 2013

(87) PCT Pub. No.: WO2012/108700
PCT Pub. Date: Aug. 16, 2012

(65) Prior Publication Data
US 2013/0308704 A1    Nov. 21, 2013

Related U.S. Application Data

(60) Provisional application No. 61/440,871, filed on Feb. 9, 2011, provisional application No. 61/454,567, filed
(Continued)

(51) Int. Cl.
H04N 19/513    (2014.01)
H04N 19/105    (2014.01)
(Continued)

(52) U.S. Cl.
CPC ........... H04N 19/513 (2014.11); H04N 19/51 (2014.11); H04N 19/583 (2014.11)

(58) Field of Classification Search
CPC .................................................. H04N 19/105
See application file for complete search history.

(56) References Cited

U.S. PATENT DOCUMENTS 7,092,576 B2    8/2006    Srinivasan et al.
7,162,093 B2    1/2007    Regunathan et al.
(Continued)

FOREIGN PATENT DOCUMENTS

KR    10-1999-0015907 A    3/1999
KR    10-1999-0027469 A    4/1999
(Continued)

OTHER PUBLICATIONS

International Search Report dated Sep. 25, 2012 for Application No. PCT/KR2012/000959, with English translation, 12 pages.
(Continued)

Primary Examiner — James Pontius
Assistant Examiner — Kyle Lotfi
(74) Attorney, Agent, or Firm — Fish & Richardson P.C.

(57) ABSTRACT

Method and apparatus for deriving a temporal motion vector predictor are described. A method for deriving a temporal motion vector predictor according to the present invention includes selecting a reference picture for a current block, determining a prediction block that corresponds to a predetermined storage unit block in the reference picture as a reference prediction unit for the current block, and deriving a temporal motion vector predictor from motion information
(Continued)

of the determined reference prediction unit. According to the present invention, image compression efficiency can be improved.

10 Claims, 23 Drawing Sheets

Related U.S. Application Data on Mar. 20, 2011, provisional application No. 61/476,776, filed on Apr. 19, 2011.

(51) Int. Cl.
*H04N 19/51* (2014.01)
*H04N 19/583* (2014.01)

(56) References Cited

U.S. PATENT DOCUMENTS

| | | |
|---|---|---|
| 7,317,839 B2 | 1/2008 | Holcomb |
| 7,369,709 B2 | 5/2008 | Hsu et al. |
| 7,529,302 B2 | 5/2009 | Mukerjee et al. |
| 7,567,617 B2 | 7/2009 | Holcomb |
| 7,577,198 B2 | 8/2009 | Holcomb |
| 7,577,200 B2 | 8/2009 | Holcomb et al. |
| 7,590,179 B2 | 9/2009 | Mukerjee |
| 7,599,438 B2 | 10/2009 | Holcomb et al. |
| 7,606,308 B2 | 10/2009 | Holcomb et al. |
| 7,606,311 B2 | 10/2009 | Hsu et al. |
| 7,609,762 B2 | 10/2009 | Crinon et al. |
| 7,616,692 B2 | 11/2009 | Holcomb et al. |
| 7,620,106 B2 | 11/2009 | Holcomb et al. |
| 7,623,574 B2 | 11/2009 | Holcomb |
| 7,630,438 B2 | 12/2009 | Mukerjee et al. |
| 7,664,177 B2 | 2/2010 | Mukerjee |
| 7,680,185 B2 | 3/2010 | Mukerjee et al. |
| 7,688,894 B2 | 3/2010 | Liang et al. |
| 7,724,827 B2 | 5/2010 | Liang et al. |
| 7,782,954 B2 | 8/2010 | Liang et al. |
| 7,839,930 B2 | 11/2010 | Holcomb et al. |
| 7,852,919 B2 | 12/2010 | Crinon et al. |
| 7,852,936 B2 | 12/2010 | Mukerjee et al. |
| 7,924,920 B2 | 4/2011 | Hsu et al. |
| 7,924,921 B2 | 4/2011 | Crinon et al. |
| 7,961,786 B2 | 6/2011 | Holcomb |
| 8,009,739 B2 | 8/2011 | Holcomb et al. |
| 8,014,450 B2 | 9/2011 | Regunathan et al. |
| 8,064,520 B2 | 11/2011 | Mukerjee et al. |
| 8,085,844 B2 | 12/2011 | Holcomb et al. |
| 8,213,779 B2 | 7/2012 | Crinon |
| 2005/0052294 A1 | 3/2005 | Liang et al. |
| 2005/0053134 A1 | 3/2005 | Holcomb |
| 2005/0053137 A1 | 3/2005 | Holcomb |
| 2005/0053140 A1 | 3/2005 | Holcomb et al. |
| 2005/0053141 A1 | 3/2005 | Holcomb et al. |
| 2005/0053142 A1 | 3/2005 | Holcomb et al. |
| 2005/0053143 A1 | 3/2005 | Holcomb et al. |
| 2005/0053144 A1 | 3/2005 | Holcomb |
| 2005/0053145 A1 | 3/2005 | Hsu et al. |
| 2005/0053146 A1 | 3/2005 | Mukerjee |
| 2005/0053147 A1 | 3/2005 | Mukerjee et al. |
| 2005/0053148 A1 | 3/2005 | Mukerjee |
| 2005/0053149 A1 | 3/2005 | Mukerjee et al. |
| 2005/0053150 A1 | 3/2005 | Hsu et al. |
| 2005/0053155 A1 | 3/2005 | Holcomb et al. |
| 2005/0053158 A1 | 3/2005 | Regunathan et al. |
| 2005/0053288 A1 | 3/2005 | Srinivasan et al. |
| 2005/0053292 A1 | 3/2005 | Mukerjee et al. |
| 2005/0053293 A1 | 3/2005 | Lin et al. |
| 2005/0053295 A1 | 3/2005 | Holcomb |
| 2005/0053296 A1 | 3/2005 | Srinivasan et al. |
| 2005/0053297 A1 | 3/2005 | Mukerjee et al. |
| 2005/0053298 A1 | 3/2005 | Mukerjee et al. |
| 2005/0053300 A1 | 3/2005 | Mukerjee |
| 2005/0058205 A1 | 3/2005 | Holcomb et al. |
| 2005/0063471 A1 | 3/2005 | Regunathan et al. |
| 2005/0068208 A1 | 3/2005 | Liang |
| 2005/0078754 A1 | 4/2005 | Liang et al. |
| 2005/0084012 A1 | 4/2005 | Hsu et al. |
| 2005/0099869 A1 | 5/2005 | Crinon et al. |
| 2005/0100093 A1 | 5/2005 | Holcomb |
| 2005/0105883 A1 | 5/2005 | Holcomb et al. |
| 2005/0111547 A1 | 5/2005 | Holcomb et al. |
| 2005/0123274 A1 | 6/2005 | Crinon et al. |
| 2005/0135783 A1 | 6/2005 | Crinon |
| 2005/0152448 A1 | 7/2005 | Crinon et al. |
| 2008/0304569 A1 | 12/2008 | Lee |
| 2009/0168890 A1 | 7/2009 | Holcomb |
| 2011/0013697 A1 | 1/2011 | Choi |
| 2012/0263231 A1* | 10/2012 | Zhou ............... H04N 19/52 375/240.12 |

FOREIGN PATENT DOCUMENTS

| | | |
|---|---|---|
| KR | 10-2009-0108111 A | 10/2009 |
| WO | WO 1997/013220 A1 | 4/1997 |

OTHER PUBLICATIONS

Supplementary European Search Report dated Dec. 2, 2014 for European Application No. 12744156.6, 10 pages.
J. Jung et al.: "Temporal MV predictor modification for MV-Comp, Skip, Direct and Merge schemes", 4. JCT-VC Meeting; 95. MPEG Meeting; Jan. 20, 2011-Jan. 28, 2011; Daegu; (Joint Collaborative Team on Video Coding of ISO/IEC JTC1/SC29/WG11AND ITU-T SG. 16 ); URL: http://wftp3.itu.int/av-arch/jctvc-site/, No. JCTVC-D164, Jan. 15, 2011 (Jan. 15, 2011), XP030008204, ISSN: 0000-0015, *section 2.2 *, * figure 1*.
Jian-Liang Lin et al: "Improved Advanced Motion Vector Prediction", 4. JCT-VC Meeting; 95. MPEG Meeting; Jan. 20, 2011-Jan. 28, 2011; Daegu;(Joint Collaborative Team o Video Coding o ISO/IEC JTC1/SC29/WG11AND ITU-T SG.16 ); URL: http://wftp3.itu.int/av-arch/jctvc-site/, No. JCTVC-D125, Jan. 15, 2011 (Jan. 15, 2011), XP030008165, ISSN: 0000-0015 * section 2.1*.
Steffen Kamp et al: "Inter-temporal 2-10 vector prediction for motion estimation in scalable video coding", Intelligent Signal Processing and Communication Systems, 2007. ISPACS 2007. International Symposium o, IEEE, PI, Nov. 1, 2007 (Nov. 1, 2007), pp. 586-589, XP031211599, ISBN: 978-1-4244-1446-8 * section 3, subsection 'Temporal Vector Candidates'*.
Seungwook Park et al: "Modifications of temporal MV Compression and Temporal MV Predictor" 96. MPEG Meeting; Mar. 21, 2011-Mar. 25, 2011; Geneva; (Motion Picture Expert Group or ISO/IEC JTC1/SC29/WG11), No. m19567, Mar. 19, 2011 (Mar. 19, 2011), XP030048134, * section 3.1* .
Taichiro Shiodera et al: "Modified Motion Vector Memory Compression", 20110311, No. JCTVC-E211, Mar. 11, 2011 (Mar. 11, 2011), XP030008717, ISSN: 0000-0007 * section 2.2 *.
Benjamin Bross et al: "BoG Report of CE9: 1-10 MV Coding and Skip/Merge Operations", 96. MPEG meeting; Mar. 21, 2011-Mar. 25, 2011; Geneva; (Motion Picture Expert Group or ISO/IEC JTC1/SC29/WG11), No. m20194, Mar. 23, 2011 (Mar. 23, 2011), XP030048761, * section 10.2.2*.
Seungwook Park et al. "CE1: Results of Experiments A.3, A.?, A.9, A.11", 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG:16 ); URL: http://wftp3.itu.int/av-arch/jctvc-site/, No. JCTVC-F112, Jul. 1, 2011 (Jul. 1, 2011), XP030009135, * the whole document *.
U.S. Office Action dated Jul. 7, 2015 for U.S. Appl. No. 14/660,425, 11 Pages.
Chinese Office Action dated Aug. 27, 2015 for Chinese Application No. 201280002994.X.
J. Jung et al.; "Temporal MV predictor modification for MV-Comp, Skip, Direct and Merge Schemes", Joint Collaborative Team on Video Coding (JCT-VC) of ITU-T SG16 WP3 and ISO/IEC JTC1/SC29/WG11, 4th Meeting, Daegu, KR, Jan. 20-28, 2011.

(56) References Cited

OTHER PUBLICATIONS

Jian-Liang, et al. "Improved Advanced Motion Vector Prediction", Joint Collaborative Team on Video Coding (JCT-VC) of ITU-T SG16 WP3 and ISO/IEC JTC1/SC29/WG11 4th Meeting, Daegu, KR, Jan. 20-28, 2011.

* cited by examiner

FIG. 7

| 710 | | | 720 |
|---|---|---|---|
| | 750 | 760 | |
| | 770 | 780 | |
| 730 | | | 740 |

FIG. 8

| (X0,Y0) | (X1,Y1) | (X2,Y2) | (X3,Y3) |
|---|---|---|---|
| (X4,Y4) | (X5,Y5) | (X6,Y6) | (X7,Y7) |
| (X8,Y8) | (X9,Y9) | (X10,Y10) | (X11,Y11) |
| (X12,Y12) | (X13,Y13) | (X14,Y14) | (X15,Y15) |

FIG. 9

| | | | |
|---|---|---|---|
| (X0,Y0) ref_idx 2 | (X1,Y1) ref_idx 1 | (X2,Y2) ref_idx 0 | (X3,Y3) ref_idx 0 |
| (X4,Y4) ref_idx 2 | (X5,Y5) ref_idx 1 | (X6,Y6) ref_idx 0 | (X7,Y7) ref_idx 0 |
| (X8,Y8) ref_idx 2 | (X9,Y9) ref_idx 0 | (X10,Y10) ref_idx 1 | (X11,Y11) ref_idx 1 |
| (X12,Y12) ref_idx 2 | (X13,Y13) ref_idx 0 | (X14,Y14) ref_idx 1 | (X15,Y15) ref_idx 1 |

910

MOTION INFORMATION MEMORY COMPRESSION

| | | | |
|---|---|---|---|
| (X0,Y0) ref_idx 2 | (X0,Y0) ref_idx 1 | (X0,Y0) ref_idx 0 | (X0,Y0) ref_idx 0 |
| (X0,Y0) ref_idx 2 | (X0,Y0) ref_idx 1 | (X0,Y0) ref_idx 0 | (X0,Y0) ref_idx 0 |
| (X0,Y0) ref_idx 2 | (X0,Y0) ref_idx 0 | (X0,Y0) ref_idx 1 | (X0,Y0) ref_idx 1 |
| (X0,Y0) ref_idx 2 | (X0,Y0) ref_idx 0 | (X0,Y0) ref_idx 1 | (X0,Y0) ref_idx 1 |

| (X0,Y0) | (X1,Y1) | (X2,Y2) | (X3,Y3) |
|---|---|---|---|
| (X4,Y4) | (X5,Y5) | (X6,Y6) | (X7,Y7) |
| (X8,Y8) | (X9,Y9) | (X10,Y10) | (X11,Y11) |
| (X12,Y12) | (X13,Y13) | (X14,Y14) | (X15,Y15) |

| 0 | 1 | 2 | 3 | 4 | 5 |
|---|---|---|---|---|---|
| 19 | | | | | 6 |
| 18 | | INTRA | | | 7 |
| 17 | | | | | 8 |
| 16 | | | | | 9 |
| 15 | 14 | 13 | 12 | 11 | 10 |

1510

FIG. 17
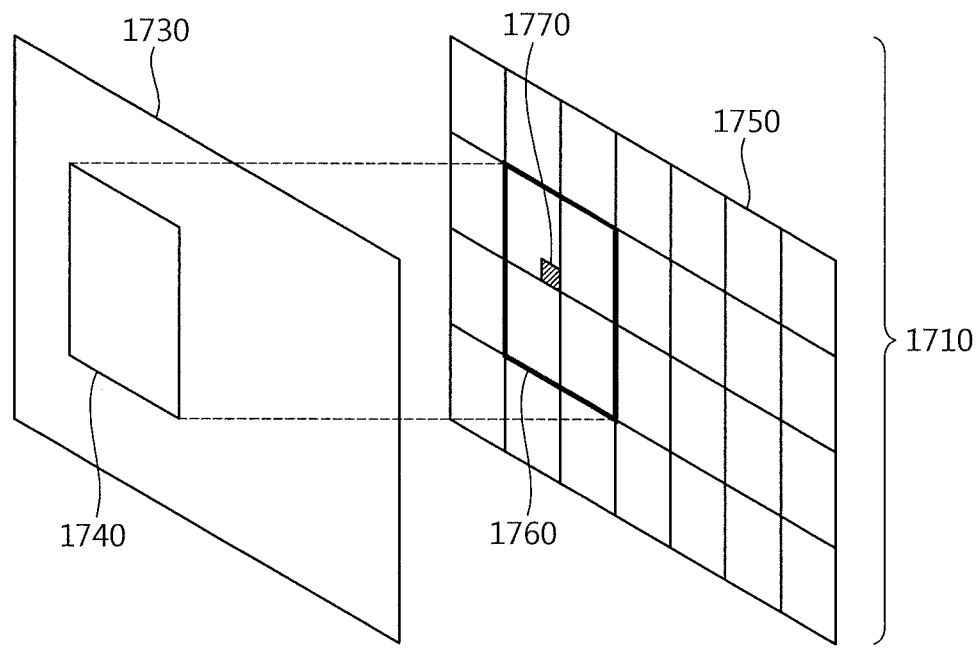
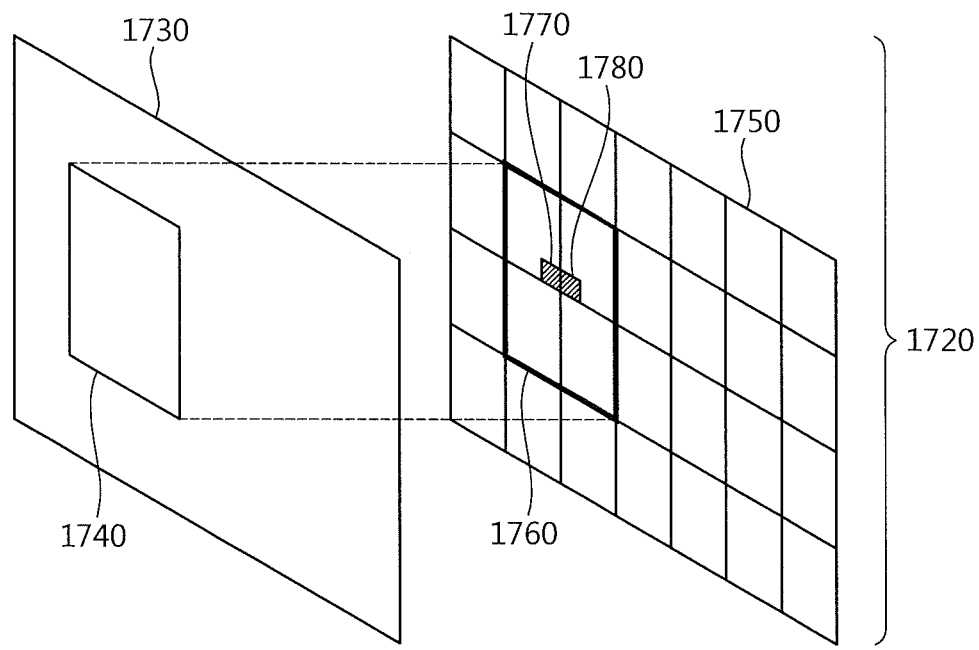

METHOD FOR ENCODING AND DECODING IMAGE AND DEVICE USING SAME

CROSS REFERENCE TO RELATED APPLICATIONS

This application is a U.S. National Phase Application under 35 U.S.C. §371 of International Application PCT/KR2012/000959, filed on Feb. 9, 2012, which claims the benefit of U.S. Provisional Application Nos. 61/440,871, filed on Feb. 9, 2011, 61/454,567, filed on Mar. 20, 2011 and 61/476,776, filed Apr. 19, 2011, the entire contents of which are hereby incorporated by reference in their entireties.

TECHNICAL FIELD

The present invention relates generally to image processing, and more particularly to a method and apparatus for inter prediction.

BACKGROUND ART

Recently, the demand for high-resolution and high-quality images, such as High Definition (HD) images and Ultra High Definition (UHD) images has been increasing in various fields. As the resolution and picture quality of image data becomes higher, the amount of information or amount of bits that are transmitted is correspondingly increased, relative to existing image data. Accordingly, in the case of transmitting image data using a medium such as an existing wire/wireless line, or in the case of storing image data using an existing storage medium, transmission costs and storage costs are increased. In order to solve these problems, high-efficiency image compression techniques may be used.

There are various image compression techniques, such as an inter prediction technique that predicts pixel values included in the current picture from a picture that is before or after the current picture, an intra prediction technique that predicts pixel values included in the current picture using pixel information from the current picture, and an entropy encoding technique that allocates a short codeword to a value having a high appearance frequency and allocates a long codeword to a value having a low appearance frequency. Image data can be effectively compressed to be transmitted or stored using such image compression techniques.

DISCLOSURE

Technical Problem

An aspect of the present invention provides a method and apparatus for encoding an image, which can improve image compression efficiency.

Another aspect of the present invention provides a method and apparatus for decoding an image, which can improve image compression efficiency.

Still another aspect of the present invention provides a method and apparatus for inter prediction, which can improve image compression efficiency.

Still yet another aspect of the present invention provides a method and apparatus for deriving a temporal motion vector predictor, which can improve image compression efficiency.

Technical Solution

1. An exemplary embodiment of the present invention provides a method for deriving a temporal motion vector predictor. The method includes selecting a reference picture for a current block; determining a prediction block that corresponds to a predetermined storage unit block in the reference picture as a reference prediction unit (colPu) for the current block; and deriving a temporal motion vector predictor (TMVP) from the motion information of the determined reference prediction unit. Here, the motion information of the reference prediction unit is motion information located in a representative pixel that the reference prediction unit covers, and the representative pixel is a pixel in which representative motion information, which is stored to represent the motion information in the predetermined storage unit block, is located.

2. According to 1, the predetermined storage unit block is a bottom right corner block that is located at a bottom right corner of a co-located block, and the co-located block is a block that is in the same position as the current block in the reference picture.

3. According to 2, if the prediction block that corresponds to the bottom right corner block in the reference picture is coded in an intra mode or is unavailable, the predetermined storage unit block is a bottom right center block that is located in a bottom right center of the co-located block.

4. According to 2, if the bottom right corner block is located outside the Largest Coding Unit (LCU) to which the current block belongs, the predetermined storage unit block is a bottom right center block that is located in a bottom right center of the co-located block.

5. According to 2, if the prediction block that corresponds to the bottom right corner block in the reference picture is coded in an intra mode or is unavailable, the predetermined storage unit block is a top left center block that is located in a top left center of the co-located block.

6. According to 1, the predetermined storage unit block is a top left center block located at a top left center of a co-located block, and the co-located block is a block that is in the same position as the current block in the reference picture.

7. According to 1, the predetermined storage unit block is a bottom right center block located at a bottom right center of a co-located block, and the co-located block is a block that is in the same position as the current block in the reference picture.

8. Another exemplary embodiment of the present invention provides a method for deriving a temporal motion vector predictor. The method includes selecting a reference picture for a current block; scanning a plurality of predetermined storage unit blocks in the reference picture in a predetermined order; selecting the storage unit block which includes available motion information and has the highest scanning priority among the plurality of the predetermined storage unit blocks; determining a prediction unit that corresponds to the selected storage unit block in the reference picture as a reference prediction unit (colPu); and deriving a temporal motion vector predictor (TMVP) from motion information of the determined reference prediction unit. Here, the motion information of the reference prediction unit is motion information located in a representative pixel that the reference prediction unit covers, and the representative pixel is a pixel in which representative motion information, which is stored to represent the motion information in the selected storage unit block, is located.

9. Still another exemplary embodiment of the present invention provides a method for inter prediction. The method includes selecting a reference picture for a current block; determining a prediction block that corresponds to a predetermined storage unit block in the reference picture as a reference prediction unit (colPu) for the current block; deriving a temporal motion vector predictor (TMVP) from motion information of the determined reference prediction unit; and generating a prediction block for the current block using the derived temporal motion vector predictor. Here, the motion information of the reference prediction unit is motion information located in a representative pixel that the reference prediction unit covers, and the representative pixel is a pixel in which representative motion information, which is stored to represent the motion information in the predetermined storage unit block, is located.

10. According to 9, the predetermined storage unit block is a bottom right corner block that is located at a bottom right corner of a co-located block, and the co-located block is a block that is in the same position as the current block in the reference picture.

11. According to 10, if the prediction block that corresponds to the bottom right corner block in the reference picture is coded in an intra mode or is unavailable, the predetermined storage unit block is a bottom right center block that is located in a bottom right center of the co-located block.

12. According to 10, if the bottom right corner block is located outside the Largest Coding Unit (LCU) to which the current block belongs, the predetermined storage unit block is a bottom right center block that is located in a bottom right center of the co-located block.

Advantageous Effects

According to the method for encoding an image according to the embodiment of the present invention, image compression efficiency can be improved.

According to the method for decoding an image according to the embodiment of the present invention, image compression efficiency can be improved.

According to the method for inter prediction according to the embodiment of the present invention, image compression efficiency can be improved.

DESCRIPTION OF DRAWINGS

FIG. 7 is a conceptual diagram schematically illustrating an embodiment of a storage unit block.

FIG. 8 is a conceptual diagram schematically illustrating another embodiment of a storage unit block.

FIG. 9 is a conceptual diagram schematically illustrating an embodiment of a method for compressing temporal motion information.

FIG. 10 is a conceptual diagram schematically illustrating another embodiment of a method for compressing temporal motion information.

FIG. 13 is a conceptual diagram schematically illustrating still another embodiment of a method for compressing temporal motion information.

FIG. 15 is a conceptual diagram schematically illustrating still another embodiment of a method for compressing temporal motion information.

FIG. 17 is a conceptual diagram schematically illustrating an embodiment of a method for deriving a temporal motion vector predictor.

MODE FOR INVENTION

Figure 1:
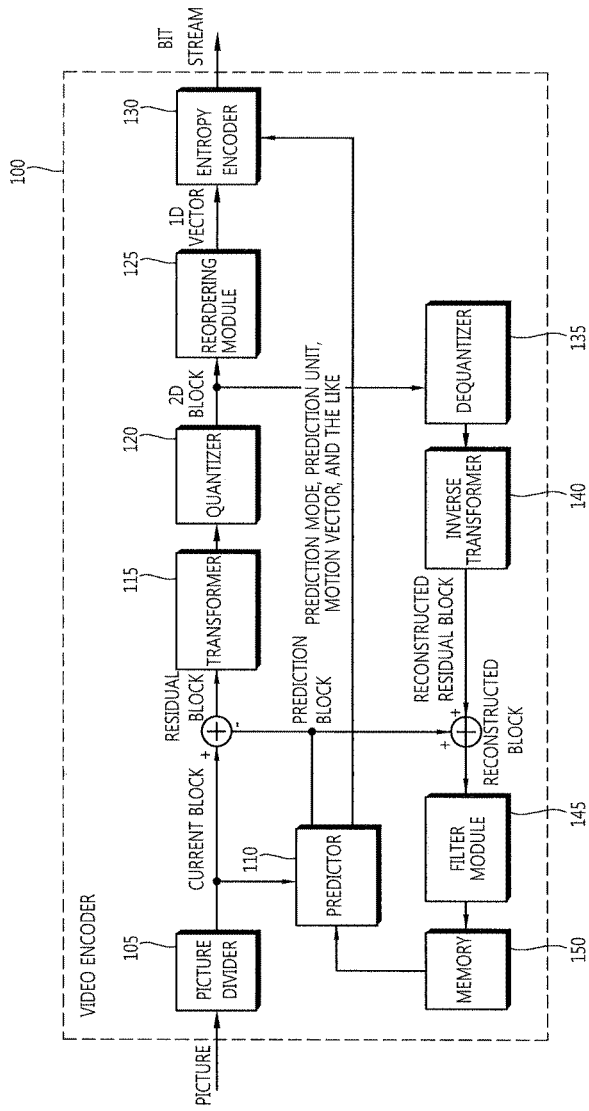
FIG. 1 is a block diagram schematically illustrating an apparatus for encoding an image according to an embodiment of the present invention.

Since the present invention may have various modifications and several embodiments, specified embodiments will be exemplified in the drawings and will be described in detail. However, the present invention is not limited to such specified embodiments. The terms used in the description are used to explain the specified embodiments only, but are not intended to limit the technical idea of the present invention. In the description, a singular expression may include a plural expression unless specially described. The terms "includes" or "has" used in the description mean that one or more other components, steps, operations and/or existence or addition of elements are not excluded in addition to the described components, steps, operations and/or elements.

On the other hand, respective configurations in the drawings, which will be described in the present invention, are independently illustrated for convenience of explanation of different functions in an video encoding/decoding apparatus, but do not mean that the configurations are implemented by separate hardware or separate software. For example, two or more configurations may be combined into one configuration, or one configuration may be divided into plural configurations. Even the embodiments in which the respective configurations are integrated and/or separated are included in the scope of the present invention unless they depart from the essential features of the present invention.

Further, some of constituent elements may not be essential constituent elements for performing the essential functions of the present invention, but may only be selective constituent elements for improving performance. The present invention may be implemented to include only the essential configuration that is necessary to implement the essential features of the present invention, excluding the constituent elements used to improve only performance, and additionally the structure that includes only the essential constituent elements excluding the selective constituent elements used to improve only performance is included in the scope of the present invention.

Hereinafter, preferred embodiments of the present invention will be described in detail with reference to the accompanying drawings. In the entire description of the present invention, the same drawing reference numerals are used for the same elements across various figures, and duplicate explanation of the same elements will be omitted.

FIG. 1 is a block diagram schematically illustrating an apparatus for encoding an image according to an embodiment of the present invention. Referring to FIG. 1, an apparatus 100 for encoding an image includes a picture divider 105, a predictor 110, a transformer 115, a quantizer 120, a reordering module 125, an entropy encoder 130, an dequantizer 135, an inverse transformer 140, a filter module 145, and a memory 150.

The picture divider 105 may divide an input picture into at least one processing unit. At this time, the processing unit may be a prediction unit (PU), a transform unit (TU), or a coding unit (CU).

The predictor 110, to be described later, may include an inter predictor that performs inter prediction and an intra predictor that performs intra prediction. The predictor 110 may perform prediction with respect to the picture processing unit in the picture divider 105 and generate prediction blocks. The picture processing unit in the predictor 110 may be a coding unit, a transform unit, or a prediction unit. Further, the predictor 110 may determine whether the prediction that is performed with respect to the corresponding processing unit is inter prediction or intra prediction, and determine the detailed contents (for example, prediction mode and the like) of the prediction method. At this time, the processing unit for performing the prediction may be different from the processing unit in which the prediction method and the detailed contents are determined. For example, the prediction method and the prediction mode may be determined in the prediction unit, and the prediction performance may be performed in the transform unit. The residual value (residual block) between the generated prediction block and the original block may be input to the transformer 115. Further, prediction mode information, motion vector information and the like that are used for the prediction may be encoded by the entropy encoder 130 together with the residual value, and then transferred to a decoder.

The transformer 115 performs the transform of the residual blocks in the transform unit and generates transform coefficients. The transform may be performed by the transformer 115 in the transform unit which may have a quad tree structure. At this time, the size of the transform unit may be determined within a range of predetermined maximum and minimum sizes. The transformer 115 may transform the residual blocks using a Discrete Cosine Transform (DCT) and/or a Discrete Sine Transform (DST).

The quantizer 120 may generate quantization coefficients by quantizing the residual values transformed by the transformer 115. The values calculated by the quantizer 120 may be provided to the dequantizer 135 and the reordering module 125.

The reordering module 125 reorders the quantization coefficients provided from the quantizer 120. By reordering the quantization coefficients, the encoding efficiency in the entropy encoder 130 can be improved. The reordering module 125 may reorder the 2D block type quantization coefficients in 1D vector form through a coefficient scanning method. The reordering module 125 may heighten the entropy encoding efficiency of the entropy encoder 130 by changing the order of coefficient scanning based on the probable statistics of the coefficients transmitted from the quantizer.

The entropy encoder 130 may perform entropy encoding on the quantization coefficients reordered by the reordering module 125. The entropy encoder 130 may encode various information, such as quantization coefficient information of the encoding unit transferred from the reordering module 125 and the predictor 110, block type information, prediction mode information, division unit information, prediction unit information and transmission unit information, motion vector information, reference picture information, interpolation information of blocks, and filtering information.

For entropy encoding, encoding methods, such as exponential Golomb, Context-Adaptive Variable Length Coding (CAVLC), and Context-Adaptive Binary Arithmetic Coding (CABAC), may be used. For example, a table for performing entropy encoding, such as Variable Length Coding (hereinafter referred to as "VLC"), may be stored in the entropy encoder 130, and the entropy encoder 130 may perform the entropy encoding using the VLC table stored therein. As another embodiment, in the CABAC entropy encoding method, the entropy encoder 130 converts symbols into bins by binarizing the symbols, and performs arithmetic encoding on the bins depending on the bin occurrence probability to generate a bit stream.

In the case where the entropy encoding is applied, an index of a low value and the corresponding short codeword may be allocated to a symbol having a high occurrence probability, and an index of a high value and the corresponding long codeword may be allocated to a symbol having a low occurrence probability. Accordingly, the amount of bits for the encoding target symbols may be reduced, and image compression performance may be improved by the entropy encoding.

The dequantizer 135 may perform dequantization on the values quantized by the quantizer 120, and the inverse transformer 140 may perform inverse transformation on the values dequantized by the dequantizer 135. The residual values generated by the dequantizer 135 and the inverse transformer 140 may be added to the prediction block predicted by the predictor 110 to generate a reconstructed block.

The filter module 145 may apply a deblocking filter and/or an Adaptive Loop Filter (ALF) to the reconstructed picture.

The deblocking filter can remove block distortion that occurs on a boundary between blocks in the reconstructed picture. The ALF may perform filtering based on a value obtained by comparing the reconstructed image with the original image after the block is filtered through the deblocking filter. The ALF may operate only in the case where high efficiency of the image is applied.

On the other hand, the filter module 145 may not perform filtering on the reconstructed blocks used for inter prediction.

The memory 150 may store the reconstructed block or picture calculated through the filter module 145. The reconstructed block or picture stored in the memory 150 may be provided to the predictor 110 that performs inter prediction.

The coding unit (CU) is a unit in which picture encoding/decoding is performed, and may be divided to have a depth based on the quad tree structure. The coding unit may have various sizes, such as 64×64, 32×32, 16×16, and 8×8.

The encoder may transmit information on the largest coding unit (LCU) and the smallest coding unit (SCU) to the decoder. Information (depth information) on the number of divisions may be transmitted to the decoder together with the information on the largest coding unit and/or the smallest coding unit. The information on whether the coding unit is divided based on the quad tree structure may be transferred from the encoder to the decoder through flag information such as a split flag.

One coding unit may be divided into a plurality of prediction units. In the case where the intra prediction is performed, the prediction mode may be determined in the prediction unit, and the prediction may be performed in the prediction unit. At this time, the prediction mode may be determined in the prediction unit, and the intra prediction may be performed in the transform unit.

Figure 2:
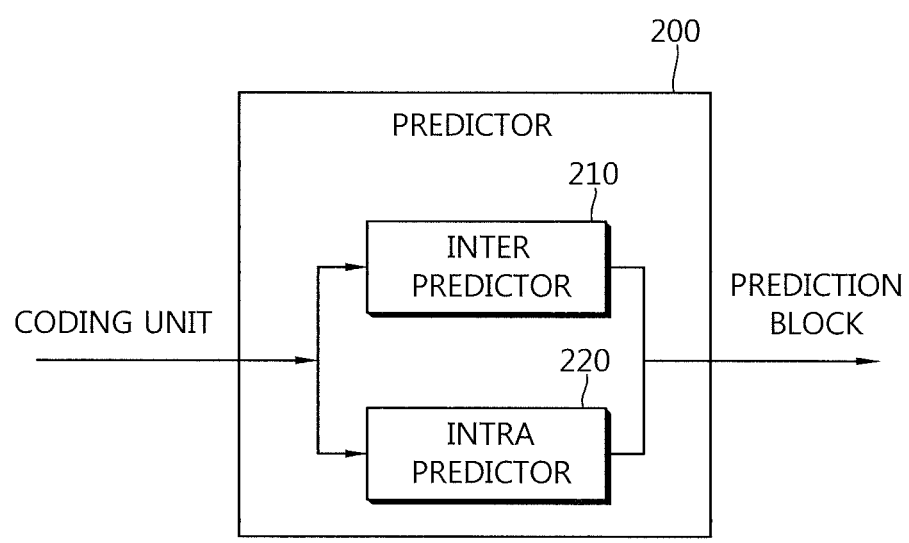
FIG. 2 is a conceptual diagram schematically illustrating a predictor according to an embodiment of the present invention.

FIG. 2 is a conceptual diagram schematically illustrating a predictor according to an embodiment of the present invention. Referring to FIG. 2, a predictor 200 may include an inter predictor 210 and an intra predictor 220.

The inter predictor 210 may generate a prediction block by performing prediction based on information of at least one picture of a previous picture and a subsequent picture of the current picture. Further, the intra predictor 220 may generate a prediction block by performing prediction based on pixel information in the current picture.

The inter predictor 210 may select a reference picture for the prediction unit and select a reference block having the same size as the prediction unit in an integer number pixel sample unit. Then, the inter predictor 210 may generate a prediction block which is most similar to the current prediction unit to minimize the residual signal and also to minimize the size of a motion vector being encoded, in the unit below an integer, such as ½ pixel sample unit and ¼ pixel sample unit. At this time, the motion vector may be expressed in the unit below an integer pixel, for example, in ¼ pixel unit for a luma pixel and in ⅛ pixel unit for a chroma pixel.

Information on the index of the reference picture and the motion vector selected by the inter predictor 210 may be encoded and transferred to the decoder.

Figure 3:
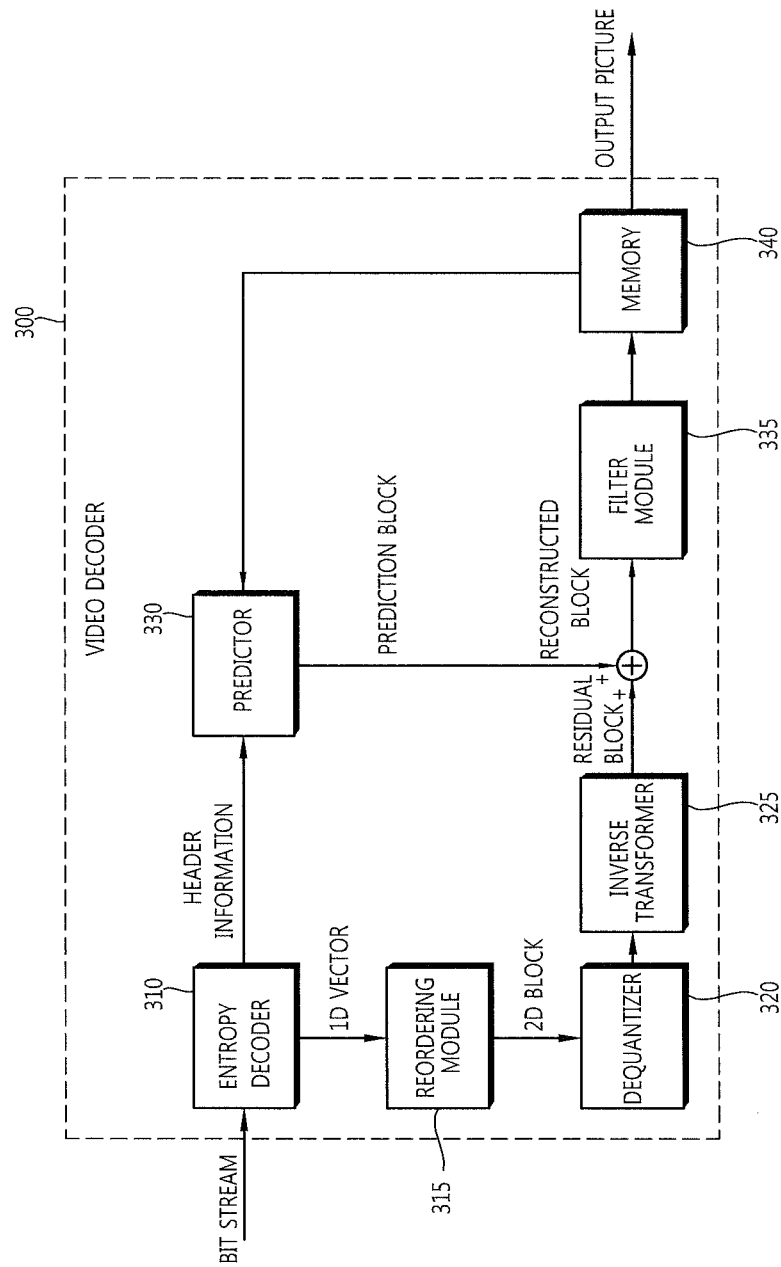
FIG. 3 is a block diagram schematically illustrating an apparatus for decoding an image according to an embodiment of the present invention.

FIG. 3 is a block diagram schematically illustrating an apparatus for decoding an image according to an embodiment of the present invention. Referring to FIG. 3, an video decoder 300 may include an entropy decoder 310, a reordering module 315, an dequantizer 320, an inverse transformer 325, a predictor 330, a filter module 335, and a memory 340.

If an image bit stream is input to the video decoder, the input bit stream may be decoded through an image information processing procedure in the video encoder.

The entropy decoder 310 may perform entropy decoding on the input bit stream, and an entropy decoding method is similar to the above-described entropy encoding method.

For example, if the Variable Length Coding (hereinafter referred to as "VLC") such as CAVLC is used to perform the entropy encoding in the video encoder, the entropy decoder 310 may perform the entropy decoding by implementing the same VLC table as the VLC table used in the encoder. Even in the case where CABAC is used to perform the entropy encoding in the video encoder, the entropy decoder 310 may perform the corresponding entropy decoding using CABAC.

In the case where the entropy decoding is applied, an index of a low value and the corresponding short codeword may be allocated to a symbol having a high occurrence probability, and an index of a high value and the corresponding long codeword may be allocated to a symbol having a low occurrence probability. Accordingly, the bit rate for the encoding target symbols may be reduced, and the image compression performance may be improved by the entropy encoding.

Information to generate a prediction block of the information decoded by the entropy decoder 310 may be provided to the predictor 330, and the residual value, of which the entropy decoding has been performed by the entropy decoder, may be input to the reordering module 315.

The reordering module 315 may reorder the bit stream entropy-decoded by the entropy decoder 310 based on the reordering method in the video encoder. The reordering module 315 may reconstruct coefficients in a one-dimensional vector form into those in a two-dimensional block form in order for reordering. The reordering module 315 may receive information related to the coefficient scanning performed by the encoder and perform the reordering through an inverse scanning method based on the order of scanning performed by the corresponding encoder.

The dequantizer 320 may perform dequantization based on quantization parameters provided from the encoder and the coefficient values of the reordered blocks.

The inverse transformer 325 may perform inverse DCT and/or inverse DCT against the DCT and DST performed by the transformer of the encoder with respect to the results of quantization performed in the video encoder. The inverse transformation may be performed based on the transmission unit or image division unit determined by the encoder. The transformer of the encoder may selectively perform the DCT and/or DST depending on plural sheets of information, such as the prediction method, the size of the current block, and the prediction direction, and the inverse transformer 325 of the decoder may perform the inverse transform based on the transform information performed by the transformer of the encoder.

The predictor 330 may generate a prediction block based on the information related to the prediction block generation provided from the entropy decoder 310 and the previously decoded block and/or picture information provided from the memory 340. A reconstructed block may be generated using the prediction block generated from the predictor 330 and the residual block provided from the inverse transformer 325.

The reconstructed block and/or picture may be provided to the filter module 335. The filter module 335 may apply deblocking filtering, Sample Adaptive Offset (SAO) and/or adaptive loop filtering (ALF) to the reconstructed block and/or picture.

The memory 340 may store and use the reconstructed picture or block as the reference picture or reference block, and may provide the reconstructed picture to an output section.

Figure 4:
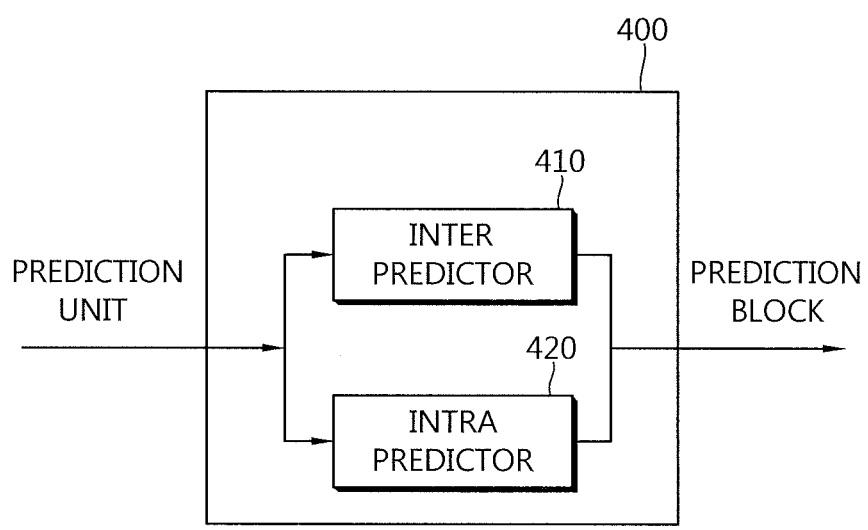
FIG. 4 is a conceptual diagram schematically illustrating a predictor of an apparatus for decoding an image according to an embodiment of the present invention.

FIG. 4 is a conceptual diagram schematically illustrating a predictor of an apparatus for decoding an image according to an embodiment of the present invention.

Referring to FIG. 4, a predictor 400 may include an intra predictor 410 and an inter predictor 420.

The intra predictor 410 may generate a prediction block based on the pixel information in the current picture if the prediction mode for the corresponding prediction unit is an intra prediction mode (intra-frame prediction mode).

If the prediction mode of the corresponding prediction unit is an inter prediction mode (inter-frame prediction mode), the inter predictor 420 may perform the inter prediction on the current prediction unit based on the information included in at least one picture of the previous picture and the subsequent picture of the current picture, including the current prediction unit using the information that is necessary for the inter prediction of the current prediction unit provided from the video encoder, for example, information on the motion vector and the reference picture index.

At this time, if a skip flag, a merge flag, and the like, of the encoding unit received from the encoder is confirmed, the motion information may be derived depending on such flags.

Hereinafter, in the case where the "image" or "frame" can represent the same meaning as the "picture" according to the configuration or expression of the invention, the "picture" may be described as the "image" or "frame". Further, the inter prediction and the inter-frame prediction have the same meaning, and the intra prediction and the intra-frame prediction have the same meaning.

In the case of the inter prediction mode, the encoder and the decoder may derive motion information from the current block and perform inter prediction on the current block based on the derived motion information.

Figure 5:
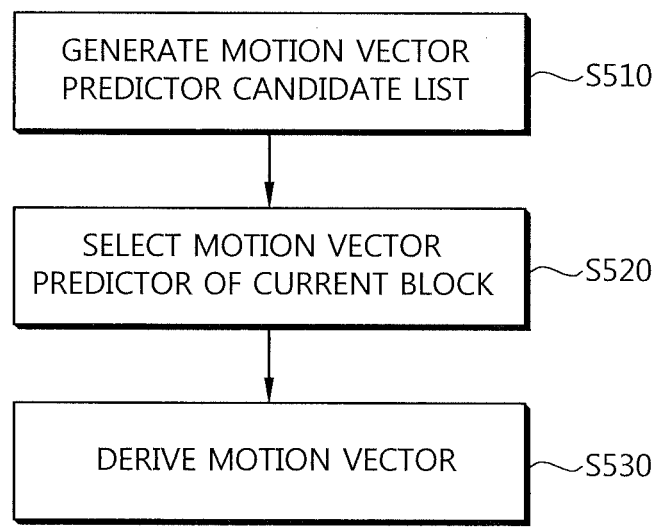
FIG. 5 is a flowchart schematically illustrating an embodiment of a method for deriving a motion vector in the case where an advanced motion vector predictor (AMVP) is applied in an inter prediction mode.

FIG. 5 is a flowchart schematically illustrating an embodiment of a method for deriving a motion vector in the case where an advanced motion vector predictor (AMVP) is applied in an inter prediction mode.

Referring to FIG. 5, the encoder and the decoder may generate a motion vector predictor candidate list for the current block (S510). Here, the motion vector predictor (MVP) may indicate a prediction value for the motion vector of the current block. Hereinafter, the motion vector predictor and the MVP have the same meaning.

The encoder and the decoder may generate the motion vector predictor candidate list using motion vectors of available neighboring blocks that are adjacent to the current block and/or temporal reference blocks included in the respective reference pictures. The temporal reference block may be derived based on blocks of the respective reference pictures co-located with the current block (hereinafter, for convenience in explanation, referred to as "co-located blocks"). The detailed embodiment of a method for deriving the temporal reference blocks will be described later.

The encoder and the decoder may select a motion vector predictor for the current block from among the motion vector predictor candidates included in the motion vector predictor candidate list (S520).

The encoder may select an optimum motion vector predictor for the current block by applying a motion vector competition (hereinafter referred to as a "MVC") to the motion vector predictor candidates included in the motion vector predictor candidate list. If the motion vector predictor is selected, the encoder may transmit a motion vector predictor index to the decoder through the bit stream. Here, the motion vector predictor index means an index that indicates the motion vector predictor of the current block, that is selected from the motion vector predictor candidates included in the motion vector predictor candidate list.

The decoder may receive the motion vector predictor index from the encoder. The decoder may select the motion vector predictor for the current block from among the motion vector predictor candidates included in the motion vector predictor candidate list using the received motion vector predictor index.

The decoder may derive the motion vector of the current block using the selected motion vector predictor (S530).

If the motion vector predictor for the current block is selected, the encoder may obtain a difference between the motion vector of the current block and the motion vector predictor. Hereinafter, the difference between the motion vector and the motion vector predictor is called a motion vector difference (MVD). The encoder may transmit information on the motion vector difference, rather than the motion vector itself, to the decoder. At this time, as the motion vector difference becomes smaller, the amount of information that is transmitted from the encoder to the decoder can be reduced.

The decoder may receive the information on the motion vector difference from the encoder. If the motion vector predictor for the current block is selected, the decoder may obtain the motion vector of the current block by adding the selected motion vector predictor and the motion vector difference with each other.

Figure 6:
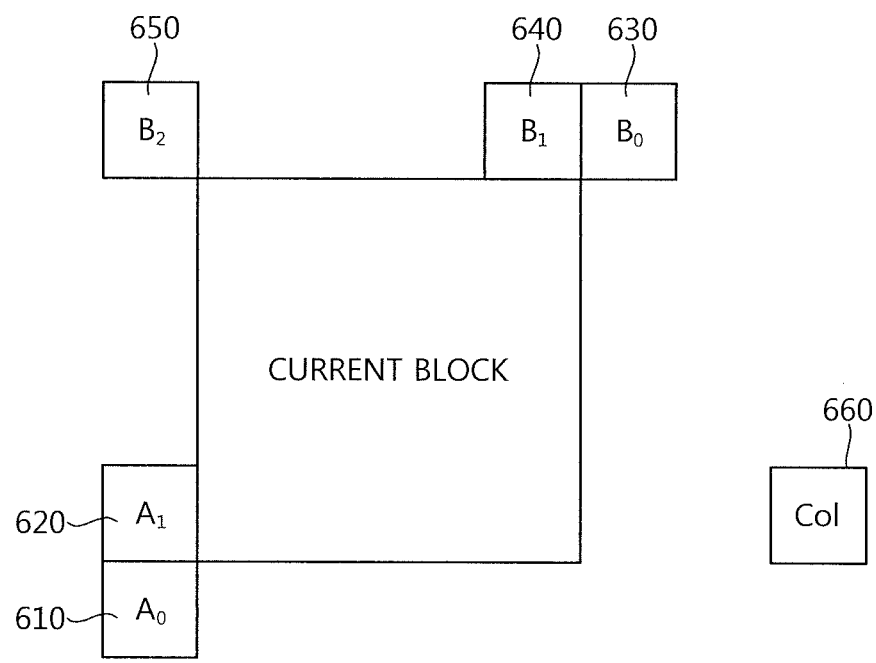
FIG. 6 is a conceptual diagram schematically illustrating an embodiment of a method for generating a motion vector predictor candidate list.

FIG. 6 is a conceptual diagram schematically illustrating an embodiment of a method for generating a motion vector predictor candidate list.

Hereinafter, one group that includes a bottom left corner block ($A_0$) 610 of the current block and a block ($A_1$) 620 located at the lowest end among blocks adjacent to the left side of the current block is called a left candidate block group. Further, one group that includes a top right corner block ($B_0$) 630 of the current block, a block ($B_1$) 640 located on the top side among the blocks adjacent to a top end of the current block, and a top left corner block ($B_2$) 650 of the current block is called a top candidate block group.

The encoder and the decoder may derive one motion vector predictor candidate from the left candidate block group. Here, the motion vector predictor candidate derived from the left candidate block group may be represented by $MV_A$. For example, the encoder and the decoder may select the motion vector of the first block which is available and has the same reference picture index as the current block as the motion vector predictor candidate $MV_A$ of the current block while scanning the blocks included in the left candidate block group in the order of $A_0 \rightarrow A_1$.

The encoder and the decoder may derive one motion vector predictor candidate from the top candidate block group. Here, the motion vector predictor candidate derived from the top candidate block group may be represented by $MV_B$. For example, the encoder and the decoder may select the motion vector of the first block which is available and has the same reference picture index as the current block as the motion vector predictor candidate $MV_B$ of the current block while scanning the blocks included in the top candidate block group in the order of $B_0 \rightarrow B_1 \rightarrow B_2$.

Further, the encoder and the decoder may select the motion vector of the temporal reference block (Co1) 660 in the reference picture as the motion vector predictor candidate of the current block. Here, the motion vector of the temporal reference block 660 may be represented by $MV_{co1}$.

In the above-described embodiment, the motion vector predictor candidate derived from the left candidate block group and the motion vector predictor candidate derived from the top candidate block group may be called spatial motion vector predictors. Further, the motion vector predictor candidate derived from the temporal reference block in the reference picture may be called a temporal motion vector predictor (TMVP). Accordingly, the motion vector predictor candidates may include the spatial motion vector predictor and the temporal motion vector predictor, and the motion vector predictor candidate list may include the spatial motion vector predictor and/or the temporal motion vector predictor.

The encoder and the decoder may remove duplicate candidates from among the motion vector predictor candidates selected by the above-described method. The encoder and the decoder may construct the motion vector predictor candidate list using the remaining motion vector predictor candidates.

When motion vector prediction is performed, not only the spatial motion vector predictor but also the temporal motion vector predictor (TMVP) may be used as the motion vector predictor candidates. As described above, the temporal motion vector predictor may mean the motion vector predictor candidate derived from the temporal reference block in the reference picture (for example, picture which is adjacent to the current picture or is close in temporal distance to the current picture). Hereinafter, the motion vector in the reference picture, which includes the temporal motion vector predictor, is called the temporal motion vector. Further, the motion information (for example, the motion vector and the reference picture index) in the reference picture is called temporal motion information.

In order to derive the temporal motion vector predictor for the current block, it is necessary that the motion information of the previously decoded picture is stored. Accordingly, when the decoded picture and/or block is stored in the memory (a reference picture buffer and/or a decoded picture buffer (DPB), the decoded motion information may be stored together with the decoded picture and/or block. The memory in which the motion information is stored may also be called a motion vector memory and/or motion vector buffer.

As an embodiment, the motion information may be stored for each minimum unit block. Here, the minimum unit block means a block in the minimum storage unit in which the motion information is stored. Hereinafter, the block in the minimum storage unit in which the motion information is stored is called the minimum unit block, and as an embodiment, the size of the minimum unit block may be 4×4.

However, if the size of the picture is large, the size of the memory that is necessary to store the motion information may become larger. In consideration of granularity of the motion information and the point that two motion vectors may be used for one block in a B slice, the size of the memory for storing the motion information is important. Accordingly, a temporal motion information compression technique may be used to reduce the size of the required memory and the memory access bandwidth.

As an embodiment of the temporal motion information compression technique, a median filter may be used to store the motion information with the granularity that is larger than the decoded motion information. In the case where the median filter is applied to the motion vector, filtering and/or compression may be performed with respect to each component of the motion vector. The motion information compression process using the median filter may be performed before the decoded picture which has passed through the adaptive loop filter is stored in the memory.

The median filter may be applied based on the storage unit that is derived by a predetermined storage unit and/or a predetermined method. Here, the storage unit may mean the unit in which the motion information is compressed and stored. Hereinafter, the block that indicates the unit in which the motion information is compressed and stored is called a storage unit block.

The predetermined storage unit may be a block having a predetermined size that is larger than the size (for example, 4×4) of the minimum unit block. Further, the storage unit may be derived using the compression information from the encoder. Here, the compression information may include a compression flag and compression ratio information. The compression flag may be a flag that indicates whether the motion information compression is applied, and the compression ratio information may indicate the compression ratio of the motion information. Since a method for transmitting the compression information and a method for deriving the storage unit using the compression information are identical to the motion information compression technique not using the median filter, as described later, the description thereof will be omitted.

In the above-described motion information compression process, the motion information can be stored with low resolution, and thus the size of the memory necessary for storing the motion information can be reduced.

As another embodiment of the temporal motion information compression technique, the method for storing the motion information that does not use the median filter may be provided.

In this method, a representative motion vector may be selected among the motion vectors in the storage unit block, and the selected representative motion vector may be allocated to all minimum unit blocks in the storage unit block. Accordingly, the motion information can be stored with low resolution, and thus the size of the memory for storing the motion information can be reduced. In the case where the representative motion vector is used rather than the median filter, the coding efficiency may be somewhat lowered in comparison to the case where the median filter is used, but the computation amount and/or complexity may be reduced. Hereinafter, embodiments of the method not using a median filter for storing the motion information will be described.

Figure 7:
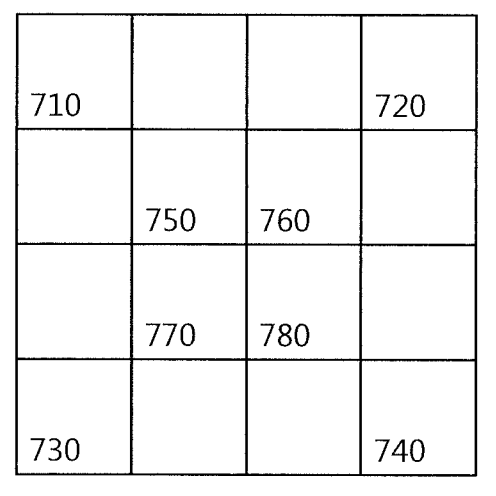

FIG. 7 is a conceptual diagram schematically illustrating an embodiment of a storage unit block.

It is assumed that coordinates of a certain pixel in the storage unit block are in the format of (x, y), and the width and the height of the storage unit block are defined as variables W and H, respectively. The number and the size of the minimum unit blocks included in the storage unit block are not limited to the embodiment in FIG. 7, and for example, the number of the minimum unit blocks included in the storage unit block may be larger or smaller than 16.

Hereinafter, in embodiments in FIGS. 8 to 15, the wording is defined and used in a manner wherein the minimum unit block including pixels which exist in $((x>>\log_2 W)<<\log_2 W, (y>>\log_2 H)<<\log_2 H)$ is a top left block 710, the minimum unit block including pixels which exist in $(((x>>\log_2 W)<<\log_2 W)+W-1, (y>>\log_2 H)<<\log_2 H)$ is a top right block 720, the minimum unit block including pixels which exist in $((x>>\log_2 W)<<\log_2 W, ((y>>\log_2 H)<<\log_2 H)+H-1)$ is a bottom left block 730, and the minimum unit block including pixels which exist in $(((x>>\log_2 W)<<\log_2 W)+W-1, ((y>>\log_2 H)<<\log_2 H)+H-1)$ is a bottom right block 740.

Further, the wording is defined and used in a manner wherein the minimum unit block including pixels which exist in $(((x>>\log_2 W)<<\log_2 W)+W/2-1, ((y>>\log_2 H)$ <<log$_2$H)+H/2−1) is a top left center block 750, the minimum unit block including pixels which exist in (((x>>log$_2$W)<<log$_2$W)+W/2, ((y>>log$_2$H)<<log$_2$H)+H/2−1) is a top right center block 760, the minimum unit block including pixels which exist in (((x>>log$_2$W)<<log$_2$W)+W/2−1, ((y>>log$_2$H)<<log$_2$H)+H/2) is a bottom left center block 770, and the minimum unit block including pixels which exist in (((x>>log$_2$W)<<log$_2$W)+W/2, ((y>>log$_2$H)<<log$_2$H)+H/2) is a bottom right center block 780.

Here, the respective blocks (the top left block 710, the top right block 720, the bottom left block 730, the bottom right block 740, the top left center block 750, the top right center block 760, the bottom left center block 770, and the bottom right center block 780) may be specified by the coordinates of the pixels included therein as described above. For example, if the size of the storage unit block is 16×16, the top left block may be specified by ((x>>4)<<4, (y>>4)<<4).

FIG. 8 is a conceptual diagram schematically illustrating another embodiment of a storage unit block.

The storage unit block may represent a unit in which the motion information is compressed and stored. The storage unit block may be a block having a predetermined size that is larger than the minimum unit block (for example, a block having 4×4 size), and for example, a block having a 16×16 size may be used as the storage unit block. At this time, as an embodiment, each of 16 minimum unit blocks included in the storage unit block may have one piece of motion information.

Further, the storage unit may be derived using the compression information transmitted from the encoder. Here, the compression information may be the compression flag and the compression ratio information. The compression flag may indicate whether the motion information compression process is applied, and the compression ratio information may indicate the compression ratio of the motion information.

The compression information may be included in a Sequence Parameter Set (SOS), a Picture Parameter Set (PPS), or a slice header and may be transmitted from the encoder to the decoder. Table 1 below shows an embodiment of an SPS in which the compression information is defined. In the embodiment of Table 1, although the compression information is defined in the SPS, it may be defined in the PPS or the slice header.

TABLE 1

| seq_parameter_set_rbsp( ) { | C | Descriptor |
|---|---|---|
| ..... | | |
| motion_vector_buffer_comp_flag | 0 | u(1) |
| if( motion_vector_buffer_comp_flag ) | | |
| motion_vector_buffer_comp_ratio_log2 | 0 | u(8) |
| rbsp_trailing_bits( ) | 0 | |
| } | | |

Here, motion_vector_buffer_com_flag may correspond to the compression flag status. For example, if motion_vector_buffer_com_flag is 1, the compression flag may indicate that the motion vector memory compression process is performed.

Here, motion_vector_buffer_com_ratio_log2 may correspond to the compression ratio information, and if motion_vector_buffer_com_ratio_log2 does not exist in the SPS, the value of motion_vector_buffer_com_ratio_log2 may be inferred to 0. At this time, as an example, the motion vector memory compression ratio may be represented by Equation 1 below.

$$MVBufferCompRatio=1<<motion\_vector\_buffer\_comp\_ratio\_log2 \quad [\text{Equation 1}]$$

or $$motion\_vector\_buffer\_comp\_ratio=1<<motion\_vector\_buffer\_comp\_ratio\_log2$$

Here, MVBufferCompRatio and motion_vector_buffer_comp_ratio may represent the motion vector memory compression ratio. For example, if the value of motion_vector_buffer_comp_ratio_log2 is 2, the value of MVBufferCompRatio and motion_vector_buffer_comp_ratio may be 4.

Referring to FIG. 8, as an embodiment, if motion_vector_buffer_comp_flag is 1, and motion_vector_buffer_comp_ratio is 4, the storage unit block may be configured as 16 minimum unit blocks in total, which are arranged by 4 lines in width and 4 lines in length, that is, which are in a 4×4 (MVBufferCompRatio-by-MVBufferCompRatio or motion_vector_buffer_comp_ratio-by-motion_vector_buffer_comp_ratio) form. Here, the storage unit block may always have a square shape. At this time, each of the 16 minimum unit blocks that constitute the storage unit block may be a block having a 4×4 size, and may have one motion vector. At this time, the overall size of the storage unit block is 16×16, and one storage unit block may have 16 motion vectors.

Table 2 below shows another embodiment of the SPS (or PPS or slice header) in which the compression information is defined.

TABLE 2

| seq_parameter_set_rbsp( ) { or PPS or Slice header | C | Descriptor |
|---|---|---|
| ..... | | |
| motion_data_buffer_comp_flag | 0 | u(1) |
| if( motion_data_buffer_comp_flag ) | | |
| motion_data_buffer_comp_ratio_log2 | 0 | u(8) |
| rbsp_trailing_bits( ) | 0 | |
| } | | |

Here, motion_data_buffer_comp_flag may correspond to the compression flag that indicates whether the motion information memory compression process is applied. For example, if motion_data_buffer_comp_flag is 1, the compression flag may indicate that the motion information memory compression process is performed.

Here, motion_data_buffer_comp_ratio_log2 may correspond to the compression ratio information that indicates the compression ratio of the motion information. At this time, the motion vector memory compression ratio may be derived by the same method as that in Equation 1, and the storage unit block may always have a square shape. For example, if motion_data_buffer_comp_ratio_log2 is 1, the size of the storage unit block may become 8×8, if motion_data_buffer_comp_ratio_log2 is 2, the size of the storage unit block may become 16×16, and if motion_data_buffer_comp_ratio_log2 is 3, the size of the storage unit block may become 32×32. As another embodiment, motion_data_buffer_comp_ratio_log2 may be defined in the unit of an integer rather than through a log scale. For example, if motion_data_buffer_comp_ratio_log2 is 1, the size of the storage unit block may become 8×8, if motion_data_buffer_comp_ratio_log2 is 2, the size of the storage unit block may become 12×12, and if motion_data_buffer_comp_ratio_log2 is 3, the size of the storage unit block may become 16×16.

Table 3 below shows still another embodiment of the SPS (or PPS or slice header) in which the compression information is defined.

TABLE 3

| seq_parameter_set_rbsp( ) { or PPS or Slice header | C | Descriptor |
|---|---|---|
| ..... | | |
| motion_data_buffer_comp_flag | 0 | u(1) |
| if( motion_data_buffer_comp_flag ) { | | |
| motion_data_buffer_comp_ratio_x_log2 | 0 | u(8) |
| motion_data_buffer_comp_ratio_y_log2 | 0 | u(8) |
| } | | |
| rbsp_trailing_bits( ) | 0 | |
| } | | |

Here, motion_data_buffer_comp_ratio_x_log2 and motion_data_buffer_comp_ratio_y_log2 may correspond to the compression ratio information that indicates the compression ratio of the motion information. Further, motion_data_buffer_comp_ratio_x_log2 may indicate the compression ratio in the x-axis direction (horizontal direction) of the motion information, and motion_data_buffer_comp_ratio_y_log2 may indicate the compression ratio in the y-axis direction (vertical direction) of the motion information. In the embodiment of Table 3, since the compression ratio in the x-axis direction and the compression ratio in the y-axis direction are separately defined, the storage unit block may have a rectangular shape rather than a square shape.

In the above-described embodiments, the compression information is defined in the SPS, PPS, or slice header. However, depending on the implementation and/or need, the compression information may be defined in a profile and/or level.

As described above, the storage unit block and/or the minimum unit block may be determined by way of various methods. In embodiments of the method for compressing the temporal motion information to be described later, for convenience in explanation, it is assumed that the size of the storage unit block is 16×16, and the size of the minimum unit block is 4×4. Further, it is assumed that one storage unit block includes 16 minimum unit blocks which are arranged in a 4×4 form.

FIG. 9 is a conceptual diagram schematically illustrating an embodiment of a method for compressing temporal motion information. In FIG. 9, (X0, Y0) to (X15, Y15) represent motion vectors, and ref_idx n (n is an integer that is equal to or larger than 0) represent reference picture indexes. The temporal motion information compression process may be performed before the decoded picture that has passed through the adaptive loop filter is stored in the memory.

In the embodiment of FIG. 9, it is assumed that the storage unit block 910 or 920 includes 16 minimum unit blocks in total, which are arranged by 4 lines in width and 4 lines in length, that is, in the 4×4 form. Here, each of 16 minimum unit blocks may have one piece of motion information, and one storage unit block may have 16 pieces of motion information. The storage unit block may be determined as a block having a predetermined size, or may be determined by the compression ratio information transmitted from the encoder. For example, the embodiment of FIG. 9 may correspond to a case where motion_vector_buffer_comp_ratio is 4.

Referring to 910 of FIG. 9, each of the decoded minimum unit blocks may have one motion vector and one reference picture index. Further, the minimum unit blocks included in one storage unit block may have separate pieces of motion information.

Referring to 920 of FIG. 9, the encoder and the decoder may select the motion vector (X0, Y0) of the top left block (TL) among the motion vectors in the storage unit block as a representative motion vector for the current storage unit block. At this time, the selected representative motion vector may be allocated to all minimum unit blocks in the storage unit block. That is, the selected representative motion vector may be stored in the memory (motion vector buffer) as a representative of 16 motion vectors in the current storage unit block. On the other hand, if the current picture is a B picture, the reference picture of the reference picture list 0 (L0) and the reference picture of the reference picture list 1 (L1) may be used for the inter prediction, and thus motion information for both L0 and L1 may be stored.

If the top left block is encoded and/or decoded in the intra mode, a motion vector may not exist in the top left block. In this case, a motion vector of (0, 0) may be allocated to all minimum unit blocks in the storage unit block. At this time, the motion vector of (0, 0) may be stored in the memory (motion vector buffer) as a representative of 16 motion vectors in the current storage unit block.

According to the above-described temporal motion information compression method, the motion vectors may be stored with low resolution, and thus the size of the memory for storing the motion vectors may be reduced. However, since the motion vectors of the top left block, that is, the motion vectors in a deflected position, are collectively allocated to all the minimum unit blocks in the storage unit block, coding efficiency may decrease. Further, in the case where the top left block is coded in the intra mode, there is a problem in that the motion vector of (0, 0) is stored regardless of whether any block coded in the inter mode exists in the blocks, except in the case of the top left block. Further, in the above-described temporal motion information compression method, since the encoder and the decoder allocate the same motion vector to all minimum unit blocks without considering the reference picture index that corresponds to each motion vector in the storage unit block, distortion may occur.

FIG. 10 is a conceptual diagram explaining another embodiment of a method for compressing temporal motion information.

FIG. 10 may illustrate one storage unit block. The storage unit block may include a plurality of minimum unit blocks. Here, each of the minimum unit blocks may have one piece of motion information. As an embodiment, the size of the minimum unit block may be 4×4, and the size of the storage unit block may be 16×16. At this time, the storage unit block may include 16 minimum unit blocks which are arranged by 4 lines in width and 4 lines in length, that is, in the 4×4 form. The sizes of the storage unit block and the minimum unit block are not limited to the above-described embodiment. The storage unit block may include the minimum unit blocks arranged in an N×N (N being a natural number) form. In FIG. 10, (X0, Y0) to (X15, Y15) represent motion vectors, and ref_idx n (n is an integer that is equal to or larger than 0) represent reference picture indexes.

The encoder and the decoder may select a motion vector of a predetermined minimum unit block from among the motion vectors in the storage unit block as a representative motion vector for the current storage unit block. At this time, the encoder and the decoder may select the motion vector in the block in an alternative specified position that is not the top left block, as the representative motion vector.

As an embodiment, the encoder and the decoder may select the motion vector (X3, Y3) of the top right block RT, the motion vector (X12, Y12) of the bottom left block BL, or the motion vector (X15, Y15) of the bottom right block BR as the representative motion vector for the current storage unit block. Further, the encoder and the decoder may select the motion vector of the top left center block Center_LT or C0, the motion vector of the top right center block Center_RT or C1, the motion vector of the bottom left center block Center_BL or C2, or the motion vector of the bottom right center block Center_BR or C3 as the representative motion vector for the current storage unit block.

The position of the minimum unit block that corresponds to the representative motion vector is not limited only to that of the above-described embodiment, but a motion vector of any minimum unit block in the storage unit block may be determined as the representative motion vector that represents the storage unit block. For example, if it is assumed that the position on the x axis of the minimum unit blocks arranged in the 4×4 form is block_x and the position on the y axis is block_y, the motion vector of any block that corresponds to the position of (block_x, block_y) (block_x=0, 1, 2, or 3, block_y=0, 1, 2, or 3) may be determined as the representative motion vector.

As another embodiment, the position of the minimum unit block that corresponds to the representative motion vector may be adaptively determined depending on the compression ratio of the motion vector. Here, the compression ratio of the motion vector may be represented by motion_vector_buffer_comp_ratio.

For example, if motion_vector_buffer_comp_ratio is 4, the motion vector of the bottom right block may be selected as the representative motion vector for the current storage unit block. Further, if motion_vector_buffer_comp_ratio is 8 or 16, the motion vector of the bottom right center block may be selected as the representative motion vector for the current storage unit block. The method for selecting the representative motion vector depending on the respective compression ratios is not limited to the above embodiment, but may differ depending on implementation and/or need.

The position of the selected representative motion vector may correspond to the representative position for storing the motion vector, and the representative motion vector may represent the whole storage unit block. That is, the selected representative motion vector may be allocated to all minimum unit blocks in the storage unit block, the selected representative motion vector may be stored in the memory (motion vector buffer) as a representative of all motion vectors in the current storage unit block.

In the above-described embodiments, the explanation has been made around the motion vector. However, the present invention is not limited thereto, but the above-described embodiments may be applied to general motion information. Here, motion information may be a reference picture index, prediction mode information (for example, in the prediction mode, L0 prediction, L1 prediction, uni-prediction, and bi-prediction may be provided), or the like, in addition to the motion vector.

Figure 11:
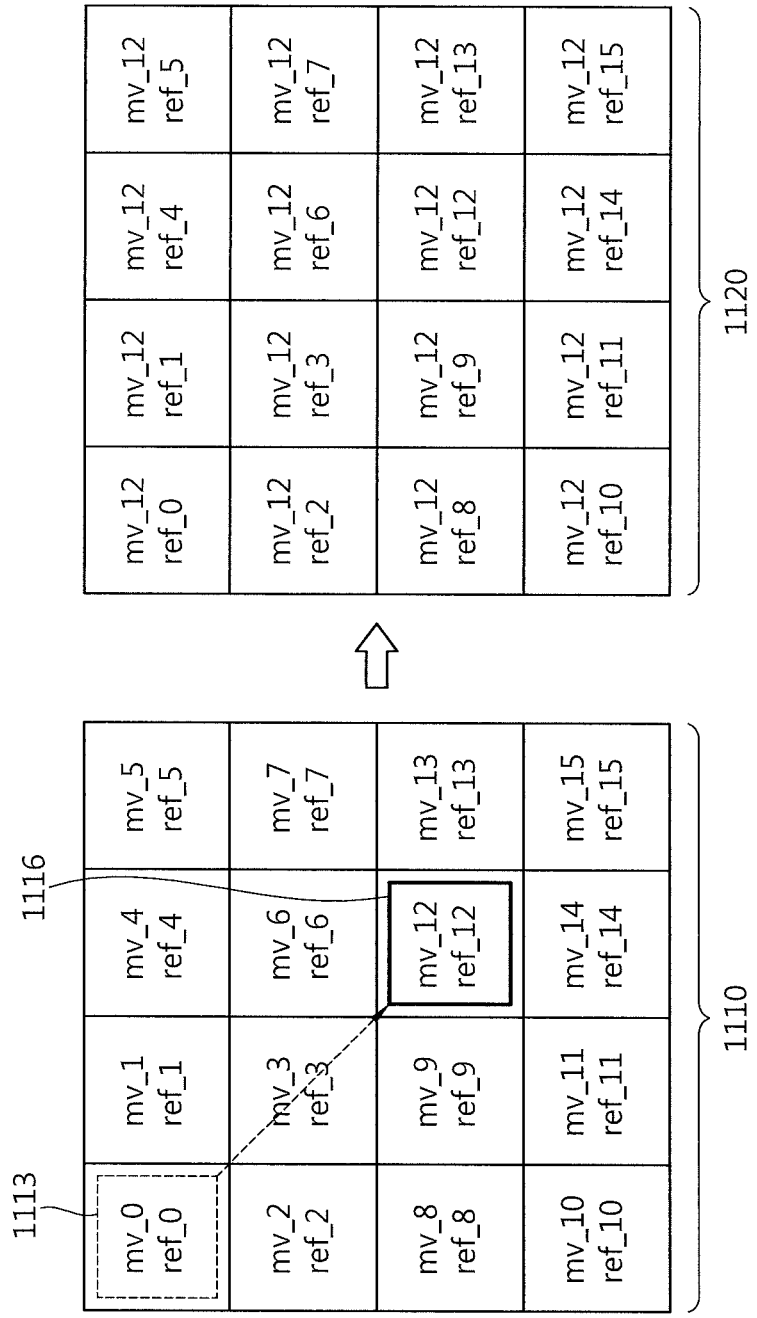
FIG. 11 is a conceptual diagram schematically illustrating still another embodiment of a method for compressing temporal motion information.

FIG. 11 is a conceptual diagram schematically illustrating still another embodiment of a method for compressing temporal motion information. 1110 and 1120 of FIG. 11 may indicate storage unit blocks. In FIG. 11, mv_n (n=0, . . . , and 15) represent motion vectors, and ref_m (m=0, . . . , and 15) represent reference picture indexes. It is assumed that mv_n and ref_m are allocated to the minimum unit blocks in a z-scan order.

Referring to 1110 of FIG. 11, the encoder and the decoder may select the motion vector mv_0 of the top left block 1113 from among the motion vectors in the storage unit block as a representative motion vector for the storage unit block. However, as described later, when the temporal motion vector predictor is derived, the block located in the bottom right center in a co-located block may be determined as the temporal reference block, and the motion vector of the determined temporal reference block may be determined as the temporal motion vector predictor. At this time, it may be inefficient that the motion vector mv_0 of the top left block 1113 is selected as the representative motion vector for the storage unit block. Accordingly, the encoder and the decoder may select the motion vector mv_12 of the bottom right center block 1116 as the representative motion vector for the storage unit block instead of the motion vector mv_0 of the top left block 1113.

Referring to 1120 of FIG. 11, the position of the selected representative motion vector mv_12 may correspond to the representative position for storing the motion vector, and the representative motion vector may represent the whole storage unit block. That is, the selected representative motion vector mv_12 may be allocated to all the minimum unit blocks in the storage unit block, and the selected representative motion vector may be stored in the memory (motion vector buffer) as a representative of all motion vectors in the current storage unit block.

Figure 12:
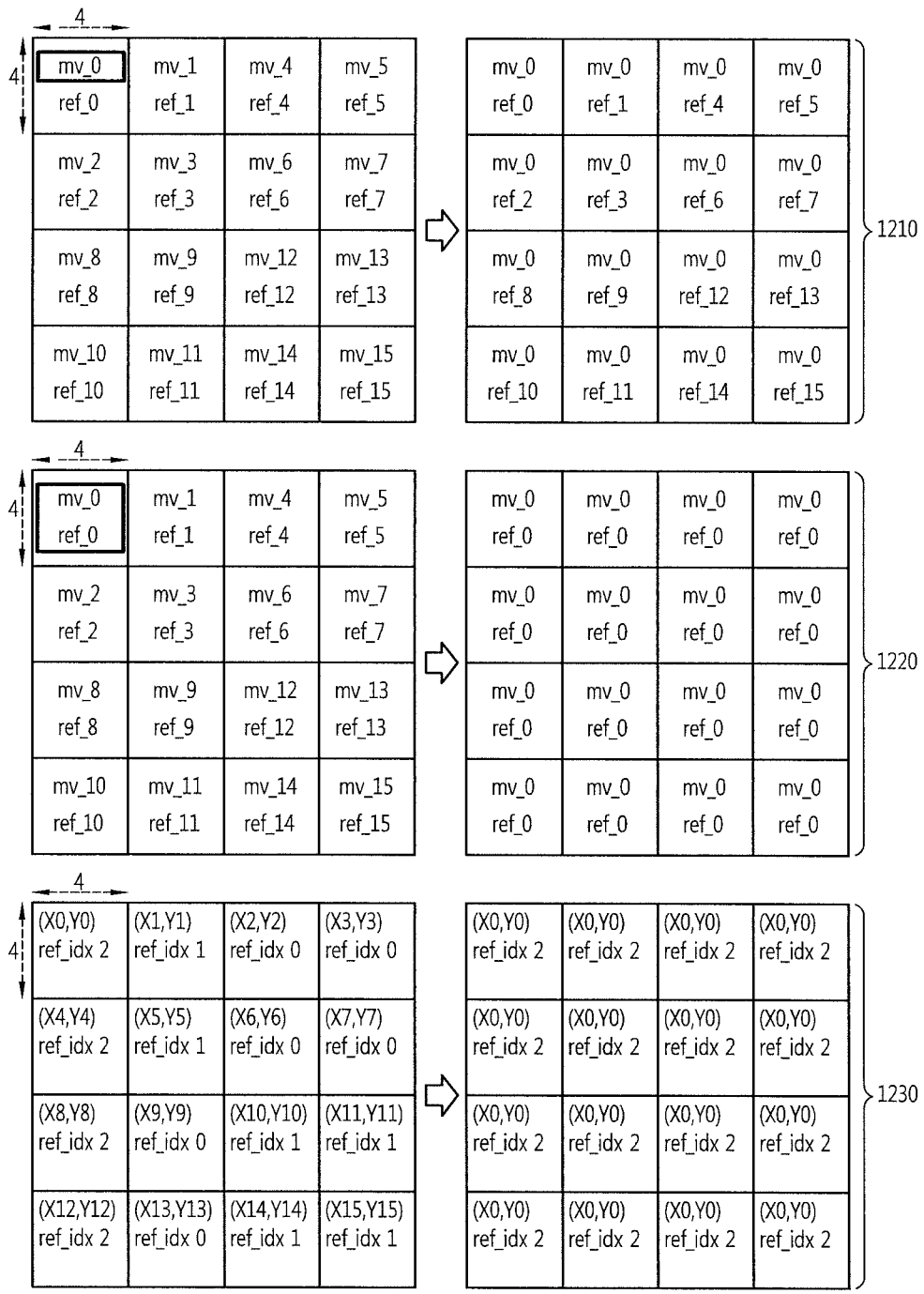
FIG. 12 is a conceptual diagram schematically illustrating still another embodiment of a method for compressing temporal motion information.

FIG. 12 is a conceptual diagram schematically illustrating still another embodiment of a method for compressing temporal motion information.

In 1210 and 1220 of FIG. 12, mv_n (n=0, . . . , and 15) represent motion vectors, and ref_m (m=0, . . . , and 15) represent reference picture indexes. It is assumed that mv_n and ref_m are allocated to the minimum unit blocks in a z-scan order. Further, in 1230 of FIG. 12, (X0, Y0) to (X15, Y15) represent motion vectors, and ref_idx n (n is an integer that is equal to or larger than 0) represent reference picture indexes.

Referring to 1210 of FIG. 12, the encoder and the decoder may select the motion vector mv_0 of the top left block among the motion vectors in the storage unit block as a representative motion vector for the storage unit block. The selected representative motion vector mv_0 may be allocated to all the minimum unit blocks in the storage unit block, and the selected representative motion vector may be stored in the memory (motion vector buffer) as a representative of all motion vectors in the current storage unit block.

In 1210 of FIG. 12, the encoder and the decoder allocate the same motion vector to all of the minimum unit blocks without consideration for the reference picture indexes that correspond to the respective motion vectors in the storage unit block. At this time, only the motion vector memory may be compressed without changing the reference picture index memory. Accordingly, inconsistency may occur between the motion vector and the reference picture index, thereby causing distortion. Such inconsistency may reduce the accuracy of the temporal motion vector predictor and lower the performance of motion vector scaling. Accordingly, in order to reduce the size of the memory allocated for the reference picture index and to improve coding efficiency, a method for compressing the temporal motion information that compresses the reference picture index memory together with the motion vectors may be provided.

Referring to 1220 of FIG. 12, in the same manner as 1210, the encoder and the decoder may select the motion vector mv_0 of the top left block from among the motion vectors in the storage unit block as a representative motion vector for the storage unit block. Further, the encoder and the decoder may select the reference picture index ref_0 of the top left block from among the reference picture indexes in the storage unit block as a representative reference picture index for the storage unit block. That is, the encoder and the decoder may select the reference picture index that the minimum unit block corresponding to the representative motion vector has as the representative reference picture index, and the reference picture index may be compressed in the same method as that used for the motion vector.

The selected representative motion vector mv_0 and representative reference picture index ref_0 may be allocated to all the minimum unit blocks in the storage unit block, and the selected representative motion vector and representative reference picture index may be stored in the memory as the representatives of all the motion vectors and all the representative reference picture indexes in the current storage unit block.

Referring to 1230 of FIG. 12, the encoder and the decoder may select the motion vector (X0, Y0) and the reference picture index ref_idx_2 in the top left block as the representative motion vector and the representative reference picture index for the storage unit block. The selected representative motion vector and representative reference picture index may be allocated to all the minimum unit blocks in the storage unit block, and the selected representative motion vector and representative reference picture index may be stored in the memory as the representatives of all the motion vectors and all the representative reference picture indexes in the storage unit block.

In the above-described 1220 and 1230, since both the motion vector and the reference picture index are compressed and stored, the distortion may be reduced. Further, the embodiment of 1220 and 1230 may be applied in combination with the above-described embodiments in FIGS. 9 to 11. That is, even in the embodiments of FIGS. 9 to 11, the reference picture index that the minimum unit block corresponding to the representative motion vector has may be selected as the reference picture index, and the reference picture index may be compressed in the same manner as the motion vector.

Figure 13:
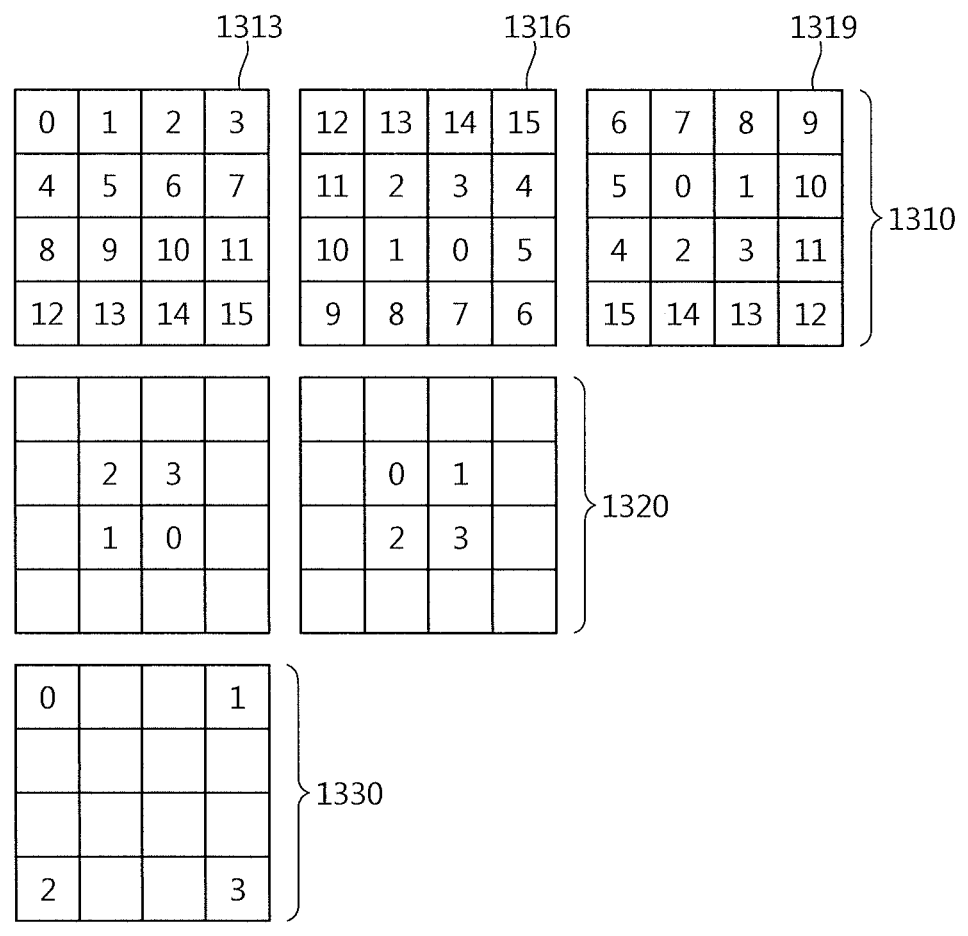

FIG. 13 is a conceptual diagram schematically illustrating still another embodiment of a method for compressing temporal motion information.

In the above-described embodiments in FIGS. 9 to 12, the minimum unit block that is selected to derive the representative motion information that represents the storage unit block may not include available motion information. The case where the minimum unit block does not include the available motion information may be resulting from the case where the minimum unit block is unavailable, the case where the minimum unit block is coded in the intra mode, or the case where there is not an available motion vector in the reference picture list (for example, reference picture list 0 and reference picture list 1) that corresponds to the minimum unit block.

In the case where the minimum unit block that is selected to derive the representative motion information does not include the available motion information, as described above with reference to FIG. 9, the encoder and the decoder may store the motion vector of (0, 0) in the memory as the representative of all the motion vectors in the storage unit block. However, if the selected minimum unit block does not include the available motion information, there may be a problem in that the motion vector of (0, 0) is allocated to all the minimum unit blocks even in the case where the available block or the block coded in the inter mode exists in the storage unit block. Accordingly, a method for compressing the temporal motion information to select the minimum unit block having the available motion information and to determine the representative motion information may be provided.

As an embodiment, the encoder and the decoder may check whether the minimum unit block being scanned has the available motion information while scanning the minimum unit blocks in the storage unit block in the predetermined order. At this time, the encoder and the decoder may select the motion information of the block that has the fastest scanning order from among the minimum unit blocks having the available motion information as the representative motion information of the storage unit block. That is, the encoder and the decoder may perform scanning on the minimum unit blocks until the encoder and the decoder find the minimum unit block having the available motion information.

Further, in the scanning process, the encoder and the decoder may check not only whether the minimum unit block has the available motion information (for example, whether the minimum unit block is coded in the inter mode) but also whether the reference picture index value that the minimum unit block has is 0. At this time, the encoder and the decoder may select the motion information of the first minimum unit block (the minimum unit block having the highest scanning priority) that satisfies the above condition as the representative motion information of the storage unit block by performing scanning on the minimum unit blocks until the minimum unit block that satisfies the above condition is found.

The position of the representative motion information selected by the above-described method may correspond to the representative position for storing the motion information, and the representative motion information may represent the entire storage unit blocks. That is, the selected representative motion information may be allocated to all the minimum unit blocks in the storage unit block, and the selected representative motion information may be stored in the memory as the representative of all pieces of motion information in the current storage unit block. For example, in the case where it is also checked whether the reference picture index value that the minimum unit block has is 0 in the scanning process, the reference picture index value of 0 may be stored in the memory as the representative of all the reference picture indexes in the current storage unit block.

The minimum unit block that is targeted for scanning and the scanning order may be diversely determined. In FIG. 13, the number indicated on the minimum unit block in each storage unit block represents the scanning order.

Referring to 1310 of FIG. 13, the encoder and the decoder may scan all the minimum unit blocks in the storage unit block. As an embodiment, as illustrated as 1313 in FIG. 13, the scanning order may be a raster scanning order. Further, as illustrated by 1316 and 1319 of FIG. 13, the encoder and the decoder may perform the scanning, starting from the neighboring blocks in the center of the storage unit blocks toward the boundary of the storage unit block.

In order to reduce the amount of computation and the complexity, the encoder and the decoder may scan only a limited number of blocks from among the minimum unit blocks in the storage unit block. As an embodiment, as illustrated by 1320 in FIG. 13, the encoder and the decoder may scan only the top left center block, the top right center block, the bottom left center block, and the bottom right center block in the predetermined order. Further, as illustrated as 1330 in FIG. 13, the encoder and the decoder may scan only the top left block, the top right block, the bottom left block and the bottom right block in the predetermined order.

The above-described embodiment may be applied to the motion vector. However, the application of the above-described embodiment is not limited thereto, and the above-described embodiment may be applied to all pieces of motion information. Here, the motion information may be the motion vector and the reference picture index. For example, the reference picture index, which the minimum unit block corresponding to the representative motion vector has, may be selected as the representative reference picture index, and the reference picture index may be compressed in the same manner as the motion vector.

Figure 14:
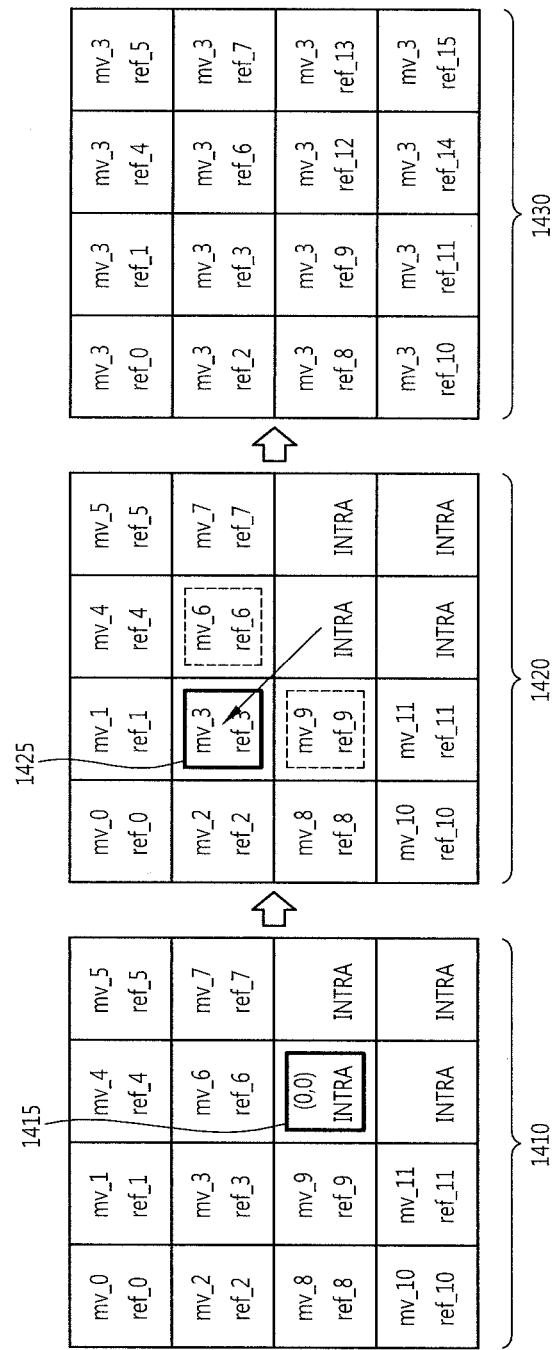
FIG. 14 is a conceptual diagram schematically illustrating still another embodiment of a method for compressing temporal motion information.

FIG. 14 is a conceptual diagram schematically illustrating still another embodiment of a method for compressing temporal motion information. In the embodiment of FIG. 14, it is assumed that the motion vector of the bottom right center block in the storage unit block is selected as the representative motion vector.

If the minimum unit block that is selected to derive the representative motion information does not include the available motion information, the encoder and the decoder may store the motion vector of (0, 0) in the memory as the representative of all the motion vectors in the storage unit block. However, the problem as described above with reference to FIG. 13 may occur.

Referring to 1410 of FIG. 14, the bottom right center block 1415 is a block that is coded in the intra mode. Accordingly, the bottom right center block 1415 may not include the available motion information. At this time, the motion vector of (0, 0) may be stored in the memory as the representative of all the motion vectors. However, although the minimum unit block having the available motion information exists in the storage unit block, the motion vector of (0, 0) is allocated to all the minimum unit blocks to cause the problem that the coding efficiency deteriorates. Accordingly, the minimum unit block having the available motion information instead of the motion vector of (0, 0) may be used to compress the motion information.

In order to solve the above-described problem, the encoder and the decoder may check whether the minimum unit block being scanned has the available motion information while scanning the minimum unit blocks in the storage unit block in the predetermined order. For example, the encoder and the decoder may scan 4 minimum unit blocks in the order of the bottom right center block, the top left center block, the top right center block, and the bottom left center block. At this time, the encoder and the decoder may select the motion information of the block having the fastest scanning order among the minimum unit blocks having the available motion information as the representative motion information of the storage unit block. That is, the encoder and the decoder may perform the scanning until the minimum unit block having the available motion information is found.

Referring to 1420 of FIG. 14, the bottom right center block is a block that is coded in the intra mode and thus may not include the available motion information. Accordingly, the encoder and the decoder may select the motion vector mv_3 of the top left center block 1425 that is located next to the bottom right center block in the scanning order as the representative motion vector of the current storage unit block.

Referring to 1430 of FIG. 14, the position of the selected representative motion vector mv_3 may correspond to the representative position to store the motion vector, and the representative motion vector may represent the entirety of the storage unit blocks. That is, the selected representative motion vector mv_3 may be allocated to all the minimum unit blocks in the storage unit block, and the selected representative motion vector may be stored in the memory (motion vector buffer) as the representative of all the motion vectors in the current storage unit block.

FIG. 15 is a conceptual diagram schematically illustrating still another embodiment of a method for compressing temporal motion information. FIG. 15 illustrates a storage unit block 1510 and neighboring blocks of the storage unit block 1510. The neighboring blocks may include blocks 1, 2, 3, 4, 6, 7, 8, 9, 11, 12, 13, 14, 16, 17, 18, and 19 that are adjacent to the storage unit block 1510 and blocks 0, 5, 10, and 15 that are located at outer corners of the storage unit block 1510. Hereinafter, in the embodiment of FIG. 15, the neighboring blocks may mean the neighboring blocks of the storage unit block 1510.

In the above-described embodiments in FIGS. 9 to 14, the minimum unit block, which is selected by the encoder and the decoder to derive the representative motion information that represents the storage unit block 1510, may not include available motion information. In this case, as a result, the motion vector of (0, 0) may be stored in the memory as the representative of all the motion vectors. The case where the minimum unit block does not include the available motion information may be the case where the minimum unit block is unavailable, the case where the minimum unit block is coded in the intra mode, or the case where there is not an available motion vector in the reference picture list (for example, reference picture list 0 and reference picture list 1) that corresponds to the minimum unit block or the motion vector in the reference picture list is unavailable.

For example, if the top left block in the storage unit block is coded in the intra mode in the embodiment of FIG. 9, the top left block may not include the available motion information. Further, in the embodiments of FIGS. 10 to 12, the minimum unit block that is selected by the encoder and the decoder may not include the available motion information. Further, in the embodiments of FIGS. 13 and 14, all the minimum unit blocks scanned by the encoder and the decoder may not include the available motion information.

In the above-described cases, the encoder and the decoder may determine the representative motion vector for the current storage unit block using the motion information of the neighboring blocks instead of selecting the motion vector of (0, 0) as the representative motion vector.

As one embodiment, it is assumed that only one block among the neighboring blocks of the storage unit block 1510 has the available motion information. At this time, the encoder and the decoder may use the motion information of the neighboring block having the available motion information as the representative motion information of the current storage unit block 1510.

As another embodiment, it is assumed that two or more blocks among the neighboring blocks of the storage unit block 1510 have the available motion information.

At this time, as one embodiment, the encoder and the decoder may use the first neighboring block having the reference picture index of 0 as the representative motion information of the current storage unit block 1510 while scanning the neighboring blocks in the order of the numbers allocated to the neighboring blocks. Here, the scanning order is not limited to the order illustrated in FIG. 15, and may differ depending on implementation and/or need.

As another embodiment, the encoder and the decoder may obtain the median value of the motion information (for example, motion vector) value of the neighboring block, and then use the median value as the representative motion information of the current storage unit block 1510. At this time, the neighboring blocks that do not include the available motion information may be excluded without having been used when the median value is derived. Further, the encoder and the decoder may allocate a predetermined motion vector value to the neighboring blocks that do not include the available motion information, and derive the median value using both the neighboring block to which the predetermined motion information value is allocated and the neighboring block including the available motion information. As an embodiment, the motion vector of (0, 0) may be allocated to the neighboring blocks that do not include the available motion information, and the motion vector of (0, 0) may be used to derive the median value.

As another embodiment, the encoder and the decoder may determine the representative motion information of the storage unit block 1510 based on a pixel difference value between the pixel of the storage unit block 1510 and the pixel of the neighboring block.

For example, in the case of a block No. 0, the final pixel difference value that is derived by a difference in pixel value between the bottom rightmost pixel of the block No. 1 and the top leftmost pixel of the storage unit block 1510 may be used to determine the representative motion information. In the case of a block No. 5, the final pixel difference value that is derived by a difference in pixel value between the bottom leftmost pixel of the block No. 5 and the top rightmost pixel of the storage unit block 1510 may be used to determine the representative motion information. Further, in the case of a block No. 10, the final pixel difference value that is derived by a difference in pixel value between the top leftmost pixel of the block No. 10 and the bottom rightmost pixel of the storage unit block 1510 may be used to determine the representative motion information. In the case of a block No. 15, the final pixel difference value that is derived by a difference in pixel value between the top rightmost pixel of the block No. 15 and the bottom leftmost pixel of the storage unit block 1510 may be used to determine the representative motion information.

Further, even in the case of a block No. 1, 2, 3, 4, 6, 7, 8, 9, 11, 12, 13, 14, 16, 17, 18, or 19, the final pixel difference value that is used to determine each of the representative motion information may be derived. Here, a boundary between the block No. N (where, N is 1, 2, 3, 4, 6, 7, 8, 9, 11, 12, 13, 14, 16, 17, 18, or 19) and the storage unit block 1510 is called a boundary No. N. At this time, a difference value between the sum of pixel values of M (where, M is a positive integer, for example, 4, 8, 16, or 32) pixels that are located nearest to the boundary No. N of the pixel in the block No. N and the sum of pixel values of M pixels which are located nearest to the boundary No. N among the pixels in the storage unit block 1510 may be obtained. The encoder and the decoder may derive an average difference value by dividing the obtained difference value by M, and use the obtained difference value as the final pixel difference value of the block No. N.

If the final pixel difference value from the storage unit block 1510 is obtained with respect to the respective neighboring blocks in the above-described method, the encoder and the decoder may determine the motion information of the block having the smallest final pixel difference value from among the neighboring blocks as the representative motion information of the current storage unit block 1510. If there are a plurality of blocks having identical smallest final pixel difference values and/or if the neighboring blocks have the same final pixel difference value, the encoder and the decoder may determine the motion information of the neighboring block having the smallest allocated number in FIG. 15 as the representative motion information of the current storage unit block 1510.

As another embodiment, all the neighboring blocks of the storage unit block 1510 may not have the available motion information. At this time, the encoder and the decoder may select the motion vector of (0, 0) as the representative motion vector.

If the representative motion information is determined, the selected representative motion information may be allocated to all the minimum unit blocks in the storage unit block 1510. Accordingly, the selected representative motion information may be stored in the memory as the representative of all pieces of motion information in the current storage unit block 1510.

The above-described embodiment may be applied to the motion vector. However, the application of the above-described embodiment is not limited thereto, but the above-described embodiment may be applied to all pieces of motion information. Here, the motion information may be the motion vector and the reference picture index. For example, the reference picture index, which the minimum unit block corresponding to the representative motion vector has, may be selected as the representative reference picture index, and the reference picture index may be compressed in the same manner as the motion vector.

On the other hand, as described above, in the case where the motion vector prediction is performed, the temporal motion vector predictor (TMVP) may be used as a motion vector predictor candidate. The temporal motion vector predictor may be obtained from the motion vector of the "temporal reference block" in the reference picture. Here, the temporal reference block may mean the storage unit block in the reference picture, which includes the motion vector that is used as the temporal motion vector predictor. The temporal reference block may be derived based on the current block, and/or the "co-located block" of the respective reference pictures, which is the block co-located with the current block. Hereinafter, in embodiments to be described later, the current block means a prediction target block in the current picture, and the current block may correspond to, for example, a prediction unit (PU).

Figure 16:
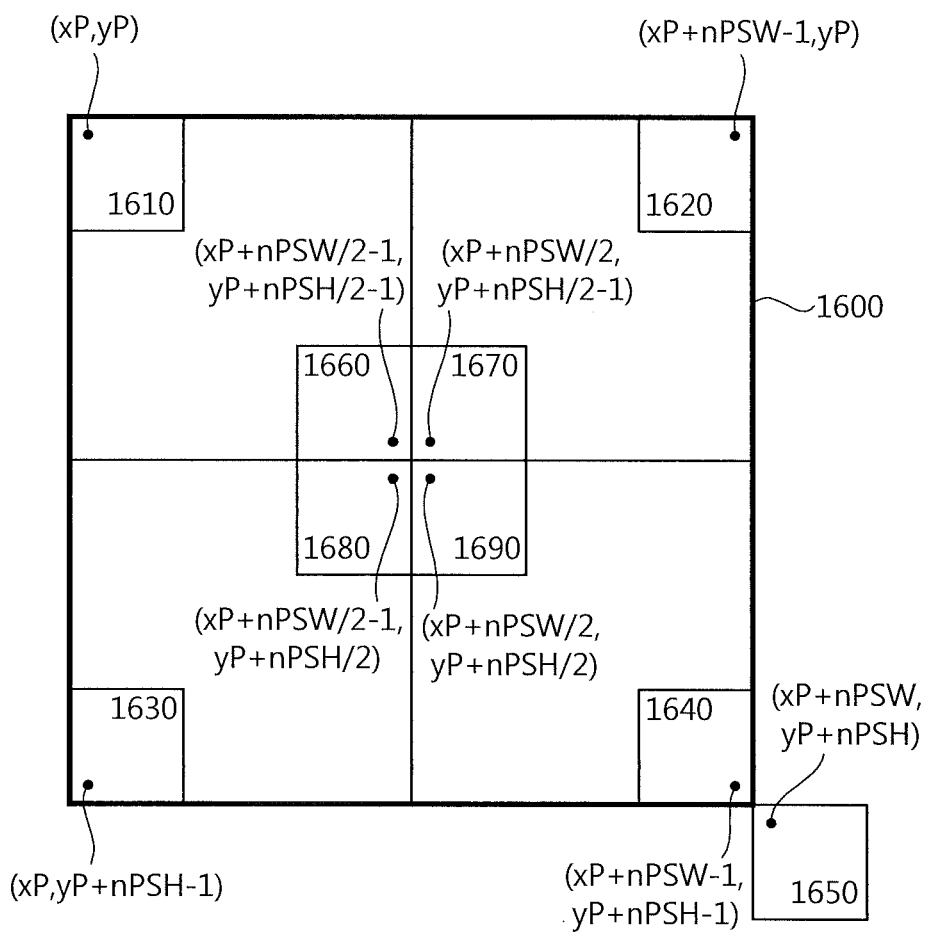
FIG. 16 is a conceptual diagram schematically illustrating a co-located block included in a reference picture.

The wording indicating the positions of the minimum unit blocks in the storage unit block (the top left block, top right block, bottom left block, bottom right block, top left center block, top right center block, bottom left center block, and bottom right center block) as described above with reference to FIG. 7 may be used as wording indicating the positions of the storage unit blocks in the current block and/or the co-located block. In the embodiment of FIG. 16, the wording used to refer to the positions of the storage unit blocks in the co-located block will be defined.

FIG. 16 is a conceptual diagram schematically illustrating a co-located block included in a reference picture. FIG. 16 illustrates a co-located block 1600 for the current block. Respective blocks that constitute the co-located block 1600 may represent the storage unit blocks. That is, the respective blocks in the co-located block may represent a unit in which the motion information is compressed and stored, and one piece of motion information may be stored in each block in the co-located block. As an embodiment, the size of the storage unit block may be 16×16.

As described above, the co-located block 1600 may mean the block in the reference picture, which is located in the same position as the current block. It is defined that the position of the top leftmost pixel in the current block and the co-located block 1600 is (xP, yP), and the width and the height of the current block and the co-located block 1600 are defined as variables of nPSW and NPSH, respectively.

Hereinafter, in the embodiment of the present invention, the wording is defined in a manner wherein a storage unit block including pixels existing in (xP, yP), that is, a storage unit block located on the top left side of the co-located block 1600, is a top left block 1610, a storage unit block including pixels existing in (xP+nPSW−1, yP), that is, a storage unit block located on the top right side of the co-located block 1600, is a top right block 1620, a storage unit block including pixels existing in (xP, yP+nPSH−1), that is, a storage unit block located on the bottom left side of the co-located block 1600, is a bottom left block 1630, and a storage unit block including pixels existing in (xP+nPSW−1, yP+nPSH−1), that is, a storage unit block located on the bottom right side of the co-located block 1600, is a bottom right block 1640. Further, a storage unit block including pixels existing in (xP+nPSW, yP+nPSH), that is, a storage unit block located on the bottom right corner of the co-located block 1600, is defined as a bottom right corner block 1650.

Further, the wording is defined in a manner wherein a storage unit block including pixels existing in (xP+nPSW/2−1, yP+nPSH/2−1), that is, a storage unit block located in the top left center of the co-located block 1600, is a top left center block 1660, a storage unit block including pixels existing in (xP+nPSW/2, yP+nPSH/2−1), that is, a storage unit block located in the top right center of the co-located block 1600, is a top right center block 1670, a storage unit block including pixels existing in (xP+nPSW/2−1, yP+nPSH/2), that is, a storage unit block located in the bottom left center of the co-located block 1600, is a bottom left center block 1680, and a storage unit block including pixels existing in (xP+nPSW/2, yP+nPSH/2), that is, a storage unit block located in the bottom right center of the co-located block 1600, is a bottom right center block 1690.

Here, as described above, the respective blocks (the top left block 1610, the top right block 1620, the bottom left block 1630, the bottom right block 1640, the bottom right corner block 1650, the top left center block 1660, the opt right center block 1670, the bottom left center block 1680, and the bottom right center block 1690) may be specified by coordinates of the pixels included therein. For example, the bottom right center block 1690 may be specified by (xP+nPSW/2, yP+nPSH/2).

In the above-described embodiment, the respective blocks are described based on the co-located block. However, since the current block and the co-located block in the reference picture occupy the same special position, the above-described pixel coordinates and wording can also be applied to the current block. Hereinafter, in the following embodiments, the position of the storage unit block is described based on the co-located block. However, the position of the storage unit block may be determined in the same manner based on the current block.

On the other hand, the encoder and the decoder may select a block in a predetermined position in the reference picture and/or in a position determined by a predetermined process as a temporal reference block for the current block. Here, the position of the temporal reference block may be determined based on the current block and/or the co-located block. The encoder and the decoder may derive the motion vector of the selected temporal reference block and determine the derived motion vector as the temporal motion vector predictor. At this time, since the temporal reference block corresponds to the storage unit, the encoder and the decoder may derive the temporal motion information predictor from the prediction unit having the same motion information as the temporal reference block.

Since the temporal reference block can represent one storage unit, as described above with reference to FIG. 16, the temporal reference block may be specified by the coordinates of the pixel included in the temporal reference block. For example, if the bottom right center block is determined as the temporal reference block, the temporal reference block may be specified by (xP+nPSW/2, yP+nPSH/2).

On the other hand, since the temporal reference block can represent one storage unit, a minimum unit block in which the representative motion information is stored may exist in the temporal reference block. As described above with reference to FIG. 7, the position in which the representative motion information is stored may be specified by the coordinates of the pixel included in the minimum unit block. For example, it is assumed that the size of the storage unit block is 16×16 and the motion information of the minimum unit block that is located on the top left side in the storage unit block is used as the representative motion information. At this time, if the coordinates of the pixel for specifying the temporal reference block are (xPCtr, yPCtr), the position of the representative motion information may be specified by ((xPCtr>>4)<<4, (yPCtr>>4)<<4).

At this time, a prediction unit that covers the coordinates where the representative motion information is specified may exist in the reference picture. In the embodiment of the present invention, the prediction unit is called colPu. Since the motion information of colPu is equal to the motion information of the selected temporal reference block, the encoder and the decoder may copy and use the motion vector of colPu as the temporal motion vector predictor of the current block.

Hereinafter, embodiments of the method for deriving the temporal motion vector predictor will be described, and the above-described contents may be applied to the methods for deriving the temporal motion vector predictor to be described later. Further, for convenience in explanation, it is assumed that the size of the storage unit of the motion vector, that is, the size of the storage unit block, is 16×16.

FIG. 17 is a conceptual diagram schematically illustrating an embodiment of a method for deriving a temporal motion vector predictor.

Referring to 1710 of FIG. 17, the current picture 1730 may represent the current encoding/decoding target picture, and may include the current block 1740. The temporal motion vector predictor for the current block 1740 may be derived from the temporal reference block in the reference picture 1750.

As an embodiment, the encoder and the decoder may select the top left center block 1770 in the co-located block 1760 as the temporal reference block for the current block 1740. At this time, the motion vector of the determined temporal reference block may be determined as the temporal motion vector predictor for the current block 1740.

However, in this case, the temporal reference block, which is selected to derive the temporal motion vector predictor, may not include available motion information. The case where the temporal reference block does not include the available motion information may be the case where the temporal reference block is unavailable or the case where the temporal reference block is coded in the intra mode.

If the temporal reference block, which is selected to derive the temporal motion vector predictor, does not include the available motion information, the encoder and the decoder may determine the motion vector of (0, 0) as the temporal motion vector predictor. However, in this case, even if the available block or the block coded in the inter mode exists in the co-located block 1760, the motion vector of (0, 0) may be determined as the temporal motion vector predictor, and the problem that inaccurate motion information is used may occur.

Referring to 1720 of FIG. 17, the top left center block 1770 in the co-located block 1760 may be a block coded in the intra mode, and the top right center block 1780 may be a block which is coded in the inter mode and includes available motion information. At this time, if the top left center block 1770 is selected as the temporal reference block, the top left center block 1770 does not include the available motion information, and thus the motion vector of (0, 0) may be determined as the temporal motion vector predictor. However, since the motion vector of (0, 0) may be inaccurate motion information and the available motion information is stored in the top right center block 1780, the encoder and the decoder may not use the motion vector of (0, 0) that is the inaccurate motion information as the temporal motion vector predictor.

Figure 18:
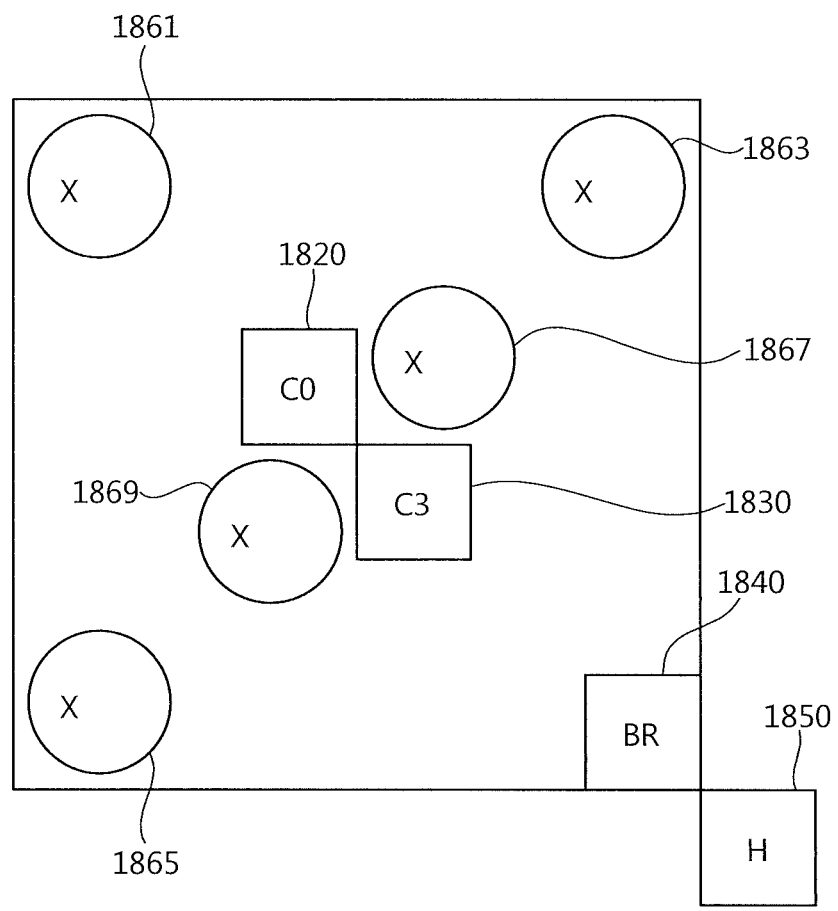
FIG. 18 is a conceptual diagram schematically illustrating an embodiment of a temporal reference block in which a temporal motion vector predictor may be located.

FIG. 18 is a conceptual diagram schematically illustrating an embodiment of a temporal reference block in which a temporal motion vector predictor may be located. FIG. 18 illustrates a block 1810 which appears when the current block and the co-located block overlap each other.

Referring to FIG. 18, the temporal reference block, from which the temporal motion vector predictor is derived, may be a top left center block (C0) 1820, a bottom right center block (C3) 1830, a bottom right block (BR) 1840, or a bottom right corner block (H) 1850.

Further, blocks located in an area indicated by X may be selected as the temporal reference blocks in which the temporal motion vector predictor is located. The block located in the area indicated by X may be a top left block 1861, a top right block 1863, a bottom left block 1865, a top right center block 1867, or a bottom left center block 1869.

Figure 19:
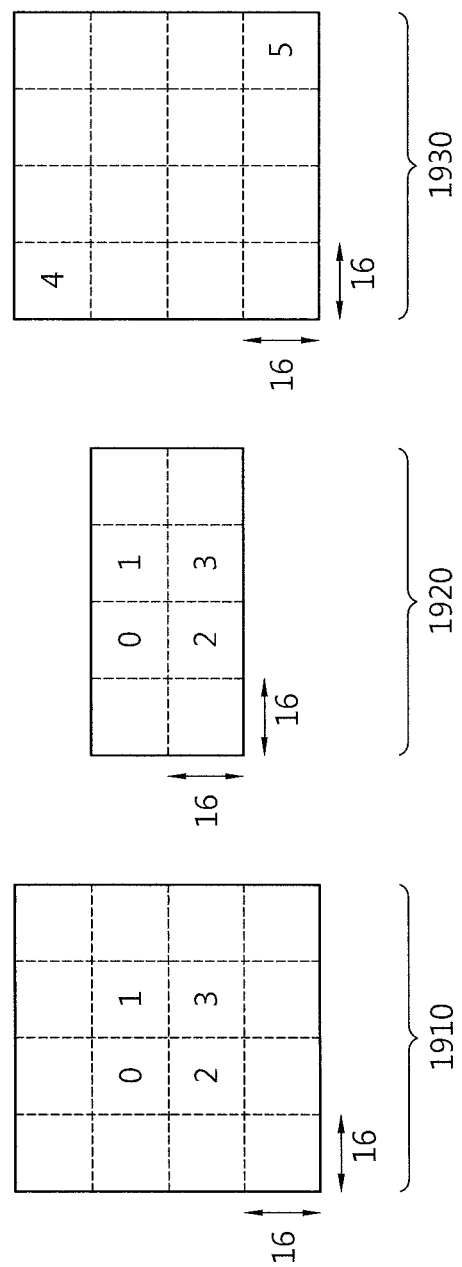
FIG. 19 is a conceptual diagram schematically illustrating another embodiment of a method for deriving a temporal motion vector predictor.

FIG. 19 is a conceptual diagram schematically illustrating another embodiment of a method for deriving a temporal motion vector predictor.

Here, 1910, 1920, and 1930 of FIG. 19 illustrate co-located blocks for the current block, respectively. As described above, the co-located block may mean a block in a reference picture, that is in the same position as the current block. Further, respective blocks that constitute the co-located block may represent the storage unit blocks. That is, the respective blocks in the co-located block may represent the unit in which the motion information is compressed and stored, and one piece of motion information may be stored in each block in the co-located block. As described above with reference to FIG. 8, the size of the storage unit block may be determined as a predetermined size, and may be derived using the compression information transmitted from the encoder. At this time, the compression information may be included in a Sequence Parameter Set (SPS), a Picture Parameter Set (PPS), or a slice header to be transmitted from the encoder to the decoder. In the embodiment of FIG. 19, it is assumed that the size of the storage unit of the motion vector, that is, the size of the storage unit block, is 16×16.

As described above, the encoder and the decoder may select the block in the specified position in the co-located block as the temporal reference block for the current block. The encoder and the decoder may derive the motion vector of the selected temporal reference block, and determine the derived motion vector as the temporal motion vector predictor.

On the other hand, 1910 of FIG. 19 illustrates the co-located block in the case where the size of the current block is 64×64. Referring to 1910 of FIG. 19, as an example, the block in the predetermined position that is selected to derive the temporal motion vector predictor may be the top left center block (block No. 0) of the co-located block. That is, the encoder and the decoder may select the top left center block (block No. 0) as the temporal reference block for the current block. In this case, the motion vector of the top left center block (block No. 0) may be used as the temporal motion vector predictor.

As another example, the block in the predetermined position that is selected to derive the temporal motion vector predictor may be the top right center block (block No. 1) of the co-located block. At this time, the encoder and the decoder may select the top right center block (block No. 1) as the temporal reference block for the current block. As still another example, the block in the predetermined position that is selected to derive the temporal motion vector predictor may be the bottom left center block (block No. 2) of the co-located block. At this time, the encoder and the decoder may select the bottom left center block (block No. 2) as the temporal reference block for the current block. Further, as still another example, the block in the predetermined position that is selected to derive the temporal motion vector predictor may be the bottom right center block (block No. 3) of the co-located block. At this time, the encoder and the decoder may select the bottom right center block (block No. 3) as the temporal reference block for the current block. In the above-described examples, the motion vector of the selected temporal reference block may be used as the temporal motion vector predictor for the current block.

As one embodiment, it is assumed that the bottom right center block (block No. 3) is used as the temporal reference block and the motion information of the minimum unit block that is located in the bottom right center in the storage unit block is used as the representative motion information. At this time, a detailed embodiment of a method for guiding colPu is as follows.

The encoder and the decoder may select the bottom right center block in the co-located block as the temporal reference block. At this time, the position of the temporal reference block may be specified by the coordinates of the pixels included in the current block and the co-located block, and the bottom right center block may be specified by (xP+(nPSW>>1), yP+(nPSW>>1)). This may be represented as follows.

Variable colPu and its position (xPCol, yPCol) are derived in the following ordered steps:

Bottom-right center luma position of the current prediction unit is defined by $$xPCtr = xP + (nPSW >> 1)$$

$$yPCtr = yP + (nPSH >> 1)$$

Here, xPCtr and yPCtr may represent the coordinates specified by the temporal reference block. xP and yP may represent the coordinates of the top leftmost pixel in the current block, mPSW may represent the width of the current block, and nPSH may represent the height of the current block.

If the temporal reference block is specified, the encoder and the decoder may specify the position of the minimum unit block in which the representative motion vector in the temporal reference block is stored. At this time, the position of the minimum unit block may be specified by ((xPCtr>>4)<<4+8, (yPCtr>>4)<<4+8). At this time, colPu may be specified by the prediction unit in the reference picture, which includes the coordinates of ((xPCtr>>4)<<4+8, (yPCtr>>4)<<4+8). This may be represented as follows.

The variable colPu is set as the prediction unit covering the modified position given by ((xPCtr>>4)<<4+8, (yPCtr>>4)<<4+8) inside the colPic.

At this time, the top leftmost coordinates in colPu may be represented by (xPCol, xPCol) as follows.

(xPCol, yPCol) is set equal to the top-left luma sample of the colPu relative to the top-left luma sample of the colPic.

Further, 1920 of FIG. 19 illustrates the co-located block in the case where the size of the current block is 64×32. In 1920 of FIG. 19, the temporal motion vector predictor for the current block may be derived in a method that is identical or similar to 1910 of FIG. 19.

As an example, the block in the predetermined position that is selected to drive the temporal motion vector predictor may be the top left center block (block No. 0) of the co-located block. At this time, the encoder and the decoder may select the top left center block (block No. 0) as the temporal reference block for the current block. As another example, the block in the predetermined position that is selected to drive the temporal motion vector predictor may be the top right center block (block No. 1) of the co-located block. At this time, the encoder and the decoder may select the top right center block (block No. 1) as the temporal reference block for the current block. As still another example, the block in the predetermined position that is selected to drive the temporal motion vector predictor may be the bottom left center block (block No. 2) of the co-located block. At this time, the encoder and the decoder may select the bottom left center block (block No. 2) as the temporal reference block for the current block. As still another example, the block in the predetermined position that is selected to drive the temporal motion vector predictor may be the bottom right center block (block No. 3) of the co-located block. At this time, the encoder and the decoder may select the bottom right center block (block No. 3) as the temporal reference block for the current block. In the above-described examples, the motion vector of the selected temporal reference block may be used as the temporal motion vector predictor for the current block.

Further, 1930 of FIG. 19 illustrates the co-located block in the case where the size of the current block is 64×64. Referring to 1930 of FIG. 19, as an example, the block in the predetermined position that is selected to derive the temporal motion vector predictor may be the top left block (block No. 4) of the co-located block. That is, the encoder and the decoder may select the top left block (block No. 4) as the temporal reference block for the current block. In this case, the motion vector of the top left block (block No. 4) may be used as the temporal motion vector predictor.

As another example, the block in the predetermined position that is selected to derive the temporal motion vector predictor may be the bottom right block (block No. 5) of the co-located block. At this time, the encoder and the decoder may select the bottom right block (block No. 5) as the temporal reference block for the current block. In this case, the motion vector of the bottom right block (block No. 5) may be used as the temporal motion vector predictor.

As an embodiment, it is assumed that the bottom right block (block No. 5) is used as the temporal reference block and the motion information of the minimum unit block that is located on the bottom right side in the storage unit block is used as the representative motion information. At this time, a detailed embodiment of a method for guiding colPu is as follows.

The encoder and the decoder may select the bottom right block in the co-located block as the temporal reference block. At this time, the position of the temporal reference block may be specified by the coordinates of the pixels included in the current block and the co-located block, and the bottom right block may be specified by (xP+nPSW−1, yP+nPSW−1). This may be represented as follows.

Variable colPu and its position (xPCol, yPCol) are derived in the following ordered steps:

Right-bottom luma position within the current prediction unit is defined by $$xPRb = xP + nPSW - 1$$

$$yPRb = yP + nPSH - 1$$

Here, xPRb and yPRb may represent the coordinates specified by the temporal reference block.

If the temporal reference block is specified, the encoder and the decoder may specify the position of the minimum unit block in which the representative motion vector in the temporal reference block is stored. At this time, the position of the minimum unit block may be specified by ((xPRb>>4)<<4+12, (yPRb>>4)<<4+12). At this time, colPu may be specified by the prediction unit in the reference picture, which includes the coordinates of ((xPRb>>4)<<4+12, (yPRb>>4)<<4+12). This may be represented as follows.

The variable colPu is set as the prediction unit covering the modified position given by ((xPRb>>4)<<4+12, (yPRb>>4)<<4+12) inside the colPic.

At this time, the top leftmost coordinates in colPu may be represented by (xPCol, xPCol) as follows.

(xPCol, yPCol) is set equal to the top-left luma sample of the colPu relative to the top-left luma sample of the colPic.

Figure 20:
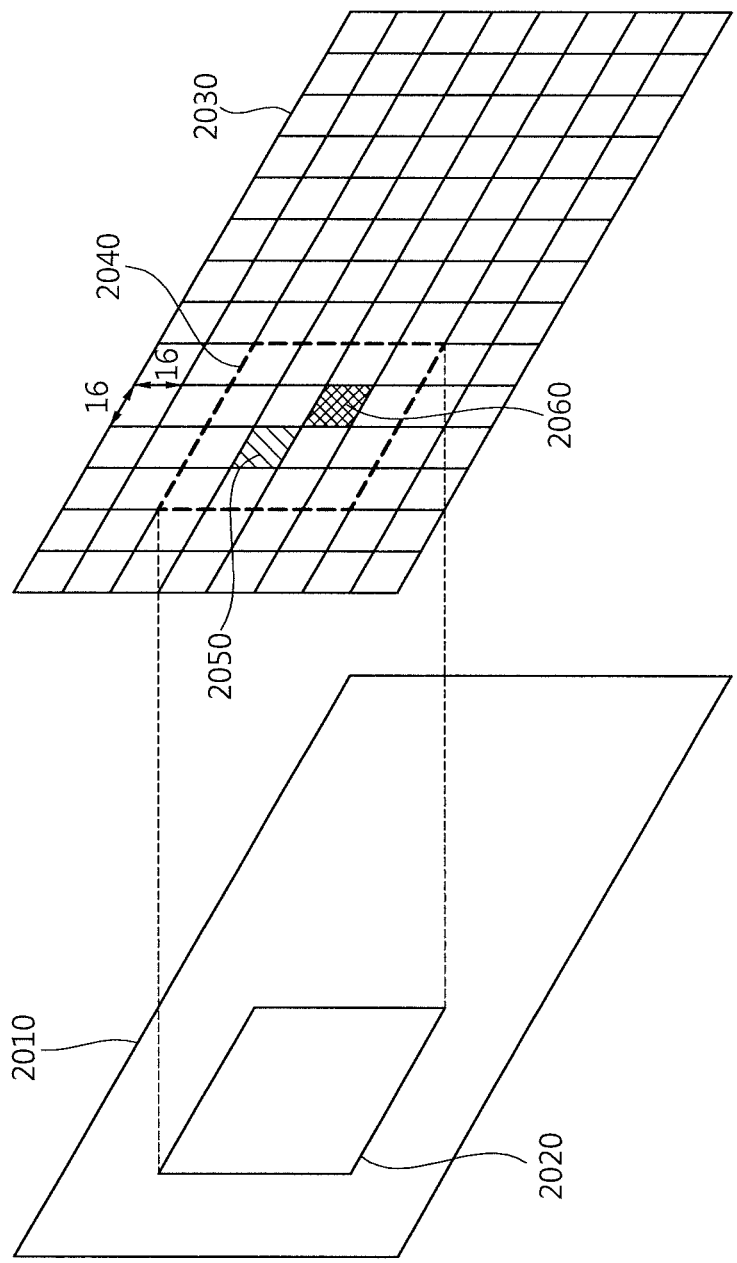
FIG. 20 is a conceptual diagram schematically illustrating still another embodiment of a method for deriving a temporal motion vector predictor.

FIG. 20 is a conceptual diagram schematically illustrating still another embodiment of a method for deriving a temporal motion vector predictor Referring to FIG. 20, the current picture 2010 represents the current encoding/decoding picture, and the current picture 2010 may include the current block 2020. The temporal motion vector predictor for the current block 2020 may be derived from the reference picture 2030.

Respective blocks constituting the reference picture 2030 may represent the storage unit blocks. That is, the respective blocks constituting the reference picture 2030 may represent a unit in which the motion information is compressed and stored, and one piece of motion information may be stored in each block constituting the reference picture 2030. As an example, the size of the storage unit block may be 16×16.

The reference picture 2030 may include a co-located block 2040 for the current block. The encoder and the decoder may select the storage unit block in the predetermined position in the co-located block 2040 as the temporal reference block for the current block 2020, and the position of the temporal reference block may correspond to the position of the temporal motion vector predictor for the current block 2020.

As an embodiment, the block in the predetermined position that is selected to drive the temporal motion vector predictor may be the top left center block 2050 of the co-located block 2040. That is, the encoder and the decoder may select the top left center block 2050 as the temporal reference block for the current block 2020. In this case, the motion vector of the top left center block 2050 may be used as the temporal motion vector predictor for the current block 2020.

As another example, the block in the predetermined position that is selected to drive the temporal motion vector predictor may be the bottom right center block 2060 of the co-located block 2040 rather than the top left center block 2050. That is, the encoder and the decoder may select the bottom right center block 2060 as the temporal reference block for the current block 2020. In this case, the motion vector of the bottom right center block 2060 may be used as the temporal motion vector predictor for the current block 2020.

Figure 21:
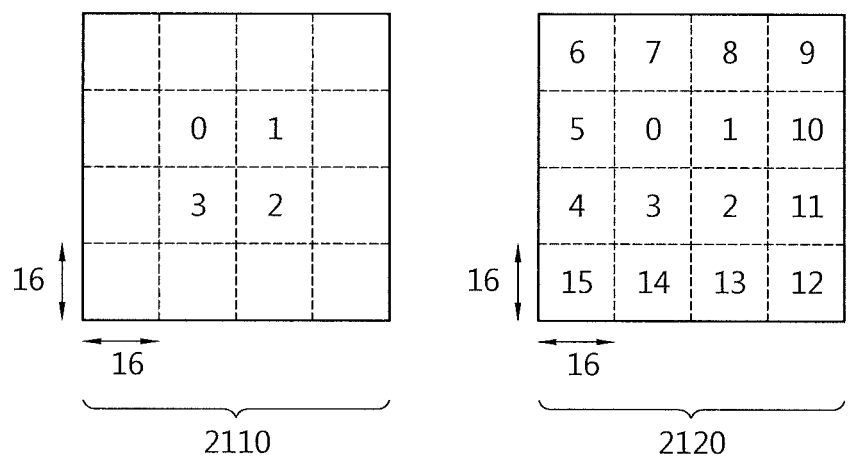
FIG. 21 is a conceptual diagram schematically illustrating still another embodiment of a method for deriving a temporal motion vector predictor.

FIG. 21 is a conceptual diagram schematically illustrating still another embodiment of a method for deriving a temporal motion vector predictor. 2110 and 2120 of FIG. 21 illustrate blocks which appear when the current block and the co-located block overlap each other.

In FIG. 21, respective blocks constituting the co-located block may represent the storage unit blocks. That is, the respective blocks constituting the co-located block may represent a unit in which the motion information is compressed and stored, and one piece of motion information may be stored in each block in the co-located block. In an embodiment of FIG. 21, for convenience of explanation, it is assumed that the size of the storage unit of the motion information, that is, the size of the storage unit block, is 16×16, and the size of the current block and the co-located block is 64×64.

As described above in the embodiments of FIGS. 17 to 20, the encoder and the decoder may select the block in the predetermined fixed position as the temporal reference block, and in this case, the motion vector of the selected temporal reference block may be used as the temporal motion vector predictor. However, in the embodiments of FIGS. 17 to 20 as described above, the temporal reference block that is selected to derive the temporal motion vector predictor may not include the available motion information. The case where the temporal reference block does not include the available motion information may be the case where the temporal reference block is coded in the intra mode or the case where an available motion vector does not exist in the reference picture list that corresponds to the temporal reference block.

As described above with reference to FIG. 9, even if the temporal reference block does not include the available motion information, the motion vector of (0, 0) may be stored in the memory with respect to the temporal reference block. At this time, the encoder and the decoder may determine the motion vector of (0, 0) as the temporal motion vector predictor. However, in this case, even if the storage unit block in which the available motion information is stored exists in the co-located block, the motion vector of (0, 0) may be determined as the temporal motion vector predictor, and the problem that inaccurate motion information is used may occur. Accordingly, a method for deriving a temporal motion vector predictor, which determines the temporal motion vector predictor by selecting the temporal reference block having available motion information, may be provided.

As one embodiment, the encoder and the decoder may scan in a predetermined order a plurality of storage unit blocks (hereinafter referred to as temporal reference block candidates. Since the motion vector of the temporal reference block can be used as the temporal motion vector predictor, the temporal reference block candidate may be called a motion vector predictor candidate) in the co-located block, and may check whether the scanned storage unit block has the available motion information (for example, whether the temporal reference block candidate is a block coded in the intra mode or whether an available motion vector exists in the reference picture list that corresponds to the temporal reference block candidate). At this time, the encoder and the decoder may select the candidate having the fastest scanning order from among the temporal reference block candidates having the available motion information, as the temporal reference block for the current block, and use the motion vector of the selected block as the temporal motion vector predictor. That is, the encoder and the decoder may perform scanning until the temporal reference block candidate having the available motion information is found, and determine the motion vector of the first temporal reference block candidate that satisfies the above-described condition as the temporal motion vector predictor for the current block.

If all of the temporal reference block candidates which are targeted for scanning do not include the available motion information (for example, if all the temporal reference block candidates are coded in the intra mode or are unavailable), the encoder and the decoder may determine the first temporal reference block candidate (the temporal reference block candidate having the highest scanning priority) in the scanning order as the temporal reference block for the current block. At this time, as an example, the motion vector of (0, 0) may be stored in the selected temporal reference block, and the motion vector of (0, 0) may be used as the temporal motion vector predictor.

The temporal reference block candidates and the scanning order may be diversely determined. The numbers marked on the respective storage unit blocks in FIG. 21 may represent the scanning order.

Referring to 2110 of FIG. 21, the encoder and the decoder may use 4 blocks among the storage unit blocks in the co-located block that corresponds to the current block as the temporal reference block candidates. Here, 4 blocks may be the top left center block (block No. 0), the top right center block (block No. 1), the bottom right center block (block No. 2), and the bottom left center block (block No. 3).

As an example, the encoder and the decoder may perform scanning in the order of block No. 0→block No. 1→block No. 2→block No. 3. The order of scanning the temporal reference block candidates may be determined differently from the order of the numbers illustrated on 2110 of FIG. 21. For example, the encoder and the decoder may perform the scanning in the order of No. 2→block No. 3→block No. 0→block No. 1.

Referring to 2120 of FIG. 21, the encoder and the decoder may use 16 blocks among the storage unit blocks in the co-located block that corresponds to the current block as the temporal reference block candidates.

As an example, the encoder and the decoder may perform scanning in the order of block No. 0→block No. 1→block No. 2→block No. 3→block No. 4→block No. 5→block No. 6→block No. 7→block No. 8→block No. 9→block No. 10→block No. 11→block No. 12→block No. 13→block No. 14→block No. 15. The order of scanning the temporal reference block candidates may be determined differently from the order of the numbers illustrated on 2120 of FIG. 21. For example, the encoder and the decoder may perform the scanning in the order of block No. 2→block No. 3→block No. 0→block No. 1→block No. 10→block No. 11→block No. 12→block No. 13→block No. 14→block No. 15→block No. 4→block No. 5→block No. 6→block No. 7→block No. 8→block No. 9.

The positions of the temporal reference block candidates and/or temporal motion vector predictor candidates are not limited to the inside of the current block and the co-located block, but may be outside of a boundary of the current block and/or the co-located block. Further, the scanning order (priority) of the temporal reference block candidates existing outside the current block and/or the co-located block may be faster (higher) than the scanning order (priority) of the temporal reference block candidates existing inside the current block and/or the co-located block. An embodiment thereof will be described later with reference to FIG. 22.

The number, the position, and the scanning order of the temporal reference block candidates (or temporal motion vector predictor candidates) are not limited to the above-described embodiments, but may be differently determined depending on the implementation and/or need. For example, if the size of the current block and the co-located block is 32×32 and the size of the storage unit block is 16×16, the maximum number of temporal reference block candidates and/or temporal motion vector predictor candidates may be 4. Further, in the case where the size of the current block and the co-located block is smaller than the size of the storage unit block, the above-described scanning method may not be used.

Figure 22:
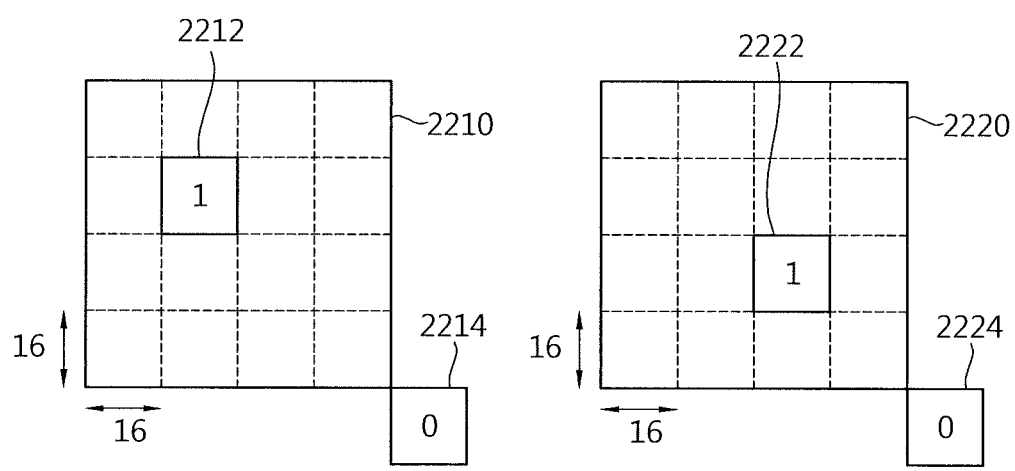
FIG. 22 is a conceptual diagram schematically illustrating still another embodiment of a method for deriving a temporal motion vector predictor.

FIG. 22 is a conceptual diagram schematically illustrating still another embodiment of a method for deriving a temporal motion vector predictor. 2210 and 2220 of FIG. 22 illustrate blocks which appear when the current block and the co-located block overlap each other.

In FIG. 22, the respective blocks constituting the co-located block may represent the storage unit blocks. That is, the respective blocks in the co-located block may represent a unit in which the motion information is compressed and stored, and one piece of motion information may be stored in each block in the co-located block. In an embodiment of FIG. 22, for convenience of explanation, it is assumed that the size of the storage unit of the motion information, that is, the size of the storage unit block, is 16×16, and the size of the current block and the co-located block is 64×64.

As described above, the encoder and the decoder may select the storage unit block located inside and/or outside of the co-located block as the temporal reference block for the current block. The encoder and the decoder may derive the motion vector of the selected temporal reference block, and determine the derived motion vector as the temporal motion vector predictor. At this time, the encoder and the decoder may derive the temporal motion information predictor from the prediction unit colPu in the reference picture, which has the same motion information as the temporal reference block.

As an embodiment, referring to 2210 of FIG. 22, the encoder and the decoder may use the bottom right corner block (block No. 0) 2214 and the top left center block (block No. 1) 2212 as the temporal reference block candidate and/or temporal motion vector predictor candidate for the current block. At this time, the encoder and the decoder may scan the temporal reference block candidate in the order of the bottom right corner block 2214→top left center block 2212 and use the motion vector of the available first block (block having high scanning priority) as the temporal motion vector predictor for the current block.

First, the encoder and the decoder may check whether the bottom right corner block 2214 is available. An example of the case where the bottom right corner block 2214 is unavailable may be the case where the bottom right corner block 2214 does not include available motion information, the case where the bottom right corner block 2214 and/or the corresponding colPu is coded in the intra mode, or the case where colPu is unavailable.

If the bottom right corner block 2214 is available, the encoder and the decoder may select the bottom right corner block 2214 as the temporal reference block. At this time, the motion vector of the bottom right corner block 2214 may be determined as the temporal motion vector predictor. If the bottom right corner block 2214 is unavailable, the encoder and the decoder may select the top left center block (block No. 1) 2212 as the temporal reference block. At this time, the motion vector of the top left center block 2212 may be determined as the temporal motion vector predictor.

As described above, in the case where the bottom right corner block 2214 and the top left center block 2212 are used as the temporal reference block candidate and/or temporal motion vector predictor candidate, a detailed embodiment of a method for guiding colPu is as follows. In the embodiment to be described later, it is assumed that the motion information of the minimum unit block that is located on the top leftmost side in the storage unit block is used as the representative motion information.

First, the encoder and the decoder may derive colPu corresponding to the bottom right corner block 2214. For this, the encoder and the decoder may specify the bottom right corner block 2214 by the coordinates of the pixels included in the current block and/or co-located block. At this time, the bottom right corner block 2214 may be specified by the coordinates of (xP+nPSW, yP+nPSW). This may be represented as follows.

Variable colPu and its position (xPCol, yPCol) are derived in the following ordered steps:

Right-bottom luma position of the current prediction unit is defined by $$xPRb = xP + nPSW$$

$$yPRb = yP + nPSH$$

Here, xPRb and yPRb may represent the coordinates specified by the temporal reference block. xP and yP may represent the coordinates of the top leftmost pixel in the current block, mPSW may represent the width of the current block, and nPSH may represent the height of the current block.

If the bottom right corner block 2214 is specified, the encoder and the decoder may specify the position of the minimum unit block in the bottom right corner block 2214, in which the representative motion vector is stored. Here, the position of the minimum unit block may be specified by the coordinates of ((xPRb>>4)<<4, (yPRb>>4)<<4). At this time, colPu may be specified by the prediction unit in the reference picture, which includes the coordinates of ((xPRb>>4)<<4, (yPBr>>4)<<4). This may be represented as follows.

the variable colPu is set as the prediction unit covering the modified position given by ((xPRb>>4)<<4, (yPRb>>4)<<4) inside the colPic.

Here, if colPu is coded in the inter mode and is available, the motion vector of colPu may be used as the temporal motion vector predictor for the current block. This may correspond to the case where the bottom right corner block 2214 is selected as the temporal reference block. However, if the colPu is coded in the intra mode or is unavailable, the encoder and the decoder may specify the top left center block 2212 by the coordinates of the pixels included in the current block and the co-located block. At this time, the top left center block 2212 may be specified by the coordinates of (xP+(nPSW>>1)−1, yP+(nPSW>>1)−1). This may be represented as follows.

If colPu is coded in an intra prediction mode or colPu is unavailable, the following applies.
Center luma position of the current prediction unit is defined by $$xPCtr = xP + (nPSW >> 1) - 1$$

$$yPCtr = yP + (nPSH >> 1) - 1$$

Here, xPCtr and yPCtr may represent the coordinates specified by the temporal reference block.

If the top left center block 2212 is specified, the encoder and the decoder may specify the position of the minimum unit block in the top left center block 2212, in which the representative motion vector is stored. Here, the position of the minimum unit block may be specified by the coordinates of ((xPCtr>>4)<<4, (yPCtr>>4)<<4). At this time, the colPu may be specified by the prediction unit in the reference picture, which includes the coordinates of ((xPCtr>>4)<<4, (yPCtr>>4)<<4). This may correspond to the case where the top left center block 2212 is selected as the temporal reference block, and may be represented as follows.

The variable colPu is set as the prediction unit covering the modified position given by ((xPCtr>>4)<<4, (yPCtr>>4)<<4) inside the colPic.

At this time, the top leftmost coordinates in colPu may be represented by (xPCol, xPCol) as follows.

(xPCol, yPCol) is set equal to the top-left luma sample of the colPu relative to the top-left luma sample of the colPic.

As another embodiment, referring to 2220 of FIG. 22, the encoder and the decoder may use the bottom right corner block (block No. 0) 2224 and the bottom right center block (block No. 1) 2222 as the temporal reference block candidate and/or temporal motion vector predictor candidate for the current block. At this time, the encoder and the decoder may scan the temporal reference block candidate in the order of the bottom right corner block 2224→bottom right center block 2222 and use the motion vector of the available first block (block having high scanning priority) as the temporal motion vector predictor for the current block.

First, the encoder and the decoder may check whether the bottom right corner block 2224 is available. An example of the case where the bottom right corner block 2224 is unavailable may be the case where the bottom right corner block 2224 does not include available motion information, the case where the bottom right corner block 2224 and/or the corresponding colPu is coded in the intra mode, or the case where colPu is unavailable.

If the bottom right corner block 2224 is available, the encoder and the decoder may select the bottom right corner block 2224 as the temporal reference block. At this time, the motion vector of the bottom right corner block 2224 may be determined as the temporal motion vector predictor. If the bottom right corner block 2224 is unavailable, the encoder and the decoder may select the bottom right center block (block No. 1) 2222 as the temporal reference block. At this time, the motion vector of the bottom right center block 2222 may be determined as the temporal motion vector predictor.

As described above, in the case where the bottom right corner block 2224 and the bottom right center block 2222 are used as the temporal reference block candidate and/or temporal motion vector predictor candidate, a detailed embodiment of a method for guiding colPu is as follows. In the embodiment to be described later, it is assumed that the motion information of the minimum unit block that is located on the top leftmost side in the storage unit block is used as the representative motion information.

First, the encoder and the decoder may derive colPu corresponding to the bottom right corner block 2224. For this, the encoder and the decoder may specify the bottom right corner block 2214 by the coordinates of the pixels included in the current block and the co-located block. At this time, the bottom right corner block 2224 may be specified by the coordinates of (xP+nPSW, yP+nPSW). This may be represented as follows.

Variable colPu and its position (xPCol, yPCol) are derived in the following ordered steps:
Right-bottom luma position of the current prediction unit is defined by $$xPRb = xP + nPSW$$

$$yPRb = yP + nPSH$$

If the bottom right corner block 2224 is specified, the encoder and the decoder may specify the position of the minimum unit block in the bottom right corner block 2224, in which the representative motion vector is stored. Here, the position of the minimum unit block may be specified by the coordinates of ((xPRb>>4)<<4, (yPRb>>4)<<4). At this time, colPu may be specified by the prediction unit in the reference picture, which includes the coordinates of ((xPRb>>4)<<4, (yPBr>>4)<<4). This may be represented as follows.

the variable colPu is set as the prediction unit covering the modified position given by ((xPRb>>4)<<4, (yPRb>>4)<<4) inside the colPic.

Here, if colPu is coded in the inter mode and is available, the motion vector of colPu may be used as the temporal motion vector predictor for the current block. This may correspond to the case where the bottom right corner block 2224 is selected as the temporal reference block. However, if the colPu is coded in the intra mode or is unavailable, the encoder and the decoder may specify the bottom right center block 2222 by the coordinates of the pixels included in the current block and the co-located block. At this time, the bottom right center block 2222 may be specified by the coordinates of (xP+(nPSW>>1), yP+(nPSW>>1)). This may be represented as follows.

If colPu is coded in an intra prediction mode or colPu is unavailable, the following applies.
Center luma position of the current prediction unit is defined by $$xPCtr = xP + (nPSW >> 1)$$

$$yPCtr = yP + (nPSH >> 1)$$

If the bottom right center block 2222 is specified, the encoder and the decoder may specify the position of the minimum unit block in the bottom right center block 2222, in which the representative motion vector is stored. Here, the position of the minimum unit block may be specified by the coordinates of ((xPCtr>>4)<<4, (yPCtr>>4)<<4). At this time, the colPu may be specified by the prediction unit in the reference picture, which includes the coordinates of ((xPCtr>>4)<<4, (yPCtr>>4)<<4). This may correspond to the case where the bottom right center block 2222 is selected as the temporal reference block, and may be represented as follows.

The variable colPu is set as the prediction unit covering the modified position given by ((xPCtr>>4)<<4, (yPCtr>>4)<<4) inside the colPic.

At this time, the top leftmost coordinates in colPu may be represented by (xPCol, xPCol) as follows.

(xPCol, yPCol) is set equal to the top-left luma sample of the colPu relative to the top-left luma sample of the colPic.

As still another embodiment, the encoder and the decoder may check whether the positions (or coordinates) of the temporal reference block candidate and/or colPu correspond to the coordinates in the LCU to which the current block belongs when checking the availability of the temporal reference block candidate. If the positions (or coordinates) of the temporal reference block candidate and/or colPu are not included in the LCU to which the current block belongs, the encoder and the decoder may consider that the temporal reference block candidate and/or colPu are unavailable.

In the embodiments of the co-located block of 2210 and 2220 as described above, the encoder and the decoder may check whether the bottom right corner block is available. If the bottom right corner block is available, the motion vector of the bottom right corner block may be used as the temporal motion vector predictor, and if the bottom right corner block is unavailable, the motion vector of the top left center block or the bottom right center block may be used as the temporal motion vector predictor. At this time, if the positions (or coordinates) of the bottom right corner block and/or the corresponding colPu are outside the boundary of the LCU to which the current block belongs, the encoder and the decoder may consider that the bottom right corner block and/or the corresponding colPu are unavailable. That is, if the positions (or coordinates) of the bottom right corner block and/or the corresponding colPu are outside the boundary of the LCU to which the current block belongs, the encoder and the decoder may determine the motion vector of the top left center block or the bottom right center block as the temporal motion vector predictor.

As described above, in the case of checking the availability of the temporal reference block candidate and/or colPu based on the LCU, a detailed embodiment of a method for guiding colPu is as follows. In the embodiment to be described later, it is assumed that the motion information of the minimum unit block located on the top leftmost side in the storage unit block is used as the representative motion information.

First, the encoder and the decoder may derive colPu corresponding to bottom right corner block. This may be represented as follows.

Variable colPu and its position (xPCol, yPCol) are derived in the following ordered steps:

Right-bottom luma position of the current prediction unit is defined by $xPRb=xP+nPSW$ $yPRb=yP+nPSH$ the variable colPu is set as the prediction unit covering the modified position given by ((xPRb>>4)<<4, (yPRb>>4)<<4) inside the colPic.

Here, if colPu is coded in the inter mode, is available, and is located on the coordinates in the LCU to which the current block belongs, the motion vector of colPu may be used as the temporal motion vector predictor for the current block. This may correspond to the case where the bottom right corner block is selected as the temporal reference block.

However, if the colPu is coded in the intra mode or is unavailable, or the position (or coordinates) of the colPu is outside the boundary of the LCU to which the current block belongs, the encoder and the decoder may derive the colPu that corresponds to the top left center block (or bottom right center block). This may correspond to the case where the top left center block (or bottom right center block) is selected as the temporal reference block, and may be represented as follows.

If colPu is coded in an intra prediction mode or colPu is unavailable or not in the current LCU, the following applies.

Center luma position of the current prediction unit is defined by $xPCtr=xP+(nPSW>>1)-1$ or $xPCtr=xP+(nPSW>>1)$ $yPCtr=yP+(nPSH>>1)-1$ or $yPCtr=yP+(nPSH>>1)$ The variable colPu is set as the prediction unit covering the modified position given by ((xPCtr>>4)<<4, (yPCtr>>4)<<4) inside the colPic.

At this time, the top leftmost coordinates in the colPu may be represented by (xPCol, xPCol) as follows.

(xPCol, yPCol) is set equal to the top-left luma sample of the colPu relative to the top-left luma sample of the colPic.

In the case of checking the availability of the temporal reference block candidate and/or colPu based on the LCU, still another embodiment of the method for deriving the colPu is as follows.

First, if the position (or coordinates) of the bottom right corner block is inside the LCU to which the current block belongs, the encoder and the decoder may derive the colPu corresponding to the bottom right corner block. If the position (or coordinates) of the bottom right corner block is outside the boundary of the LCU to which the current block belongs, the colPu may be considered to be unavailable. This may be represented as follows.

Variable colPu and its position (xPCol, yPCol) are derived in the following ordered steps:

1. The variable colPu is derived as follows $yPRb=yP+nPSH$

If (yP>>Log2MaxCuSize) is equal to (yPRb>>Log2MaxCuSize), the horizontal component of the right-bottom luma position of the current prediction unit is defined by $xPRb=xP+nPSW$ and the variable colPu is set as the prediction unit covering the modified position given by ((xPRb>>4)<<4, (yPRb>>4)<<4) inside the colPic.

Otherwise ((yP>>Log2MaxCuSize) is not equal to (yPRb>>Log2MaxCuSize)), colPu is marked as unavailable.

Here, if the colPu is coded in the inter mode and is available, the motion vector of the colPu may be used as the temporal motion vector predictor for the current block. This may correspond to the case where the bottom right corner block is selected as the temporal reference block. However, if the colPu is coded in the intra mode or is unavailable, the encoder and the decoder may derive the colPu that corresponds to the bottom right center block. This may correspond to the case where the bottom right center block is selected as the temporal reference block, and may be represented as follows.

2. When colPu is coded in an intra prediction mode or colPu is unavailable, the following applies.
Central luma position of the current prediction unit is defined by $xPCtr=(xP+(nPSW>>1)$ $yPCtr=(yP+(nPSH>>1)$ The variable colPu is set as the prediction unit covering the modified position given by ((xPCtr>>4)<<4, (yPCtr>>4)<<4) inside the colPic.

At this time, the top leftmost coordinates in the colPu may be represented by (xPCol, xPCol) as follows.

3. (xPCol, yPCol) is set equal to the top-left luma sample of the colPu relative to the top-left luma sample of the colPic.

Figure 23:
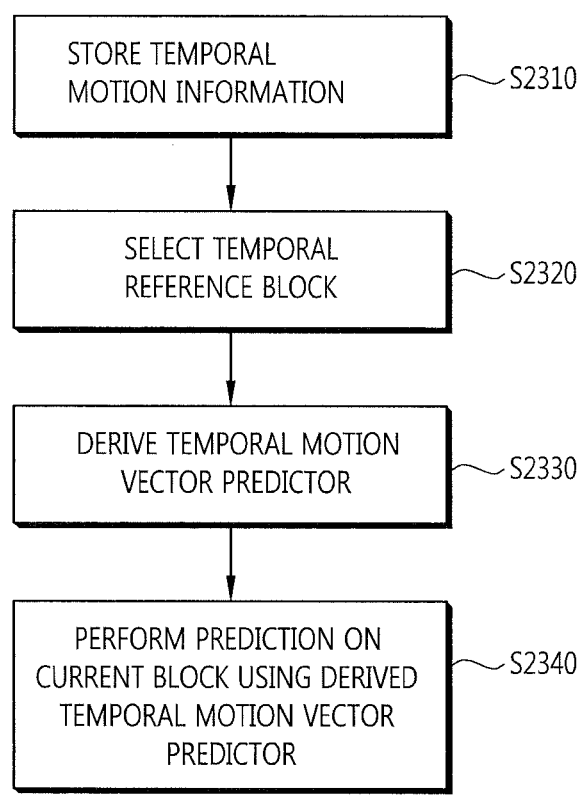
FIG. 23 is a flowchart schematically illustrating a method for inter prediction according to an embodiment of the present invention.

FIG. 23 is a flowchart schematically illustrating a method for inter prediction according to an embodiment of the present invention.

Referring to FIG. 23, the encoder and the decoder may store the temporal motion information of the reference picture (S2310). At this time, in order to reduce the size of the required memory, the encoder and the decoder may compress and store the temporal motion information. Since the embodiments of the method for compressing the temporal motion information have been described with reference to FIGS. 7 to 15, explanation thereof will be omitted.

Further, the encoder and the decoder may select the temporal reference block for the current block from the reference picture (S2320). Here, the temporal reference block may mean the storage unit block in the reference picture, which includes the motion vector that is used as the temporal motion vector predictor.

The position of the temporal reference block may be determined based on the current block and/or the co-located block for the current block. The encoder and the decoder may select the block in the predetermined position in the reference picture as the temporal reference block for the current block and select the temporal reference block among a predetermined number of temporal reference block candidates. The selected temporal reference block may be specified as the coordinates of the pixel included in the temporal reference block rather than the block itself.

Since the embodiments of the method for deriving the temporal reference block have been described with reference to FIGS. 16 to 22, explanation thereof will be omitted.

If the temporal reference block is selected and/or specified, the encoder and the decoder may derive the temporal motion vector predictor for the current block using the temporal reference block (S2330).

The encoder and the decoder may derive the motion vector of the temporal reference block. At this time, the derived motion vector may be determined as the temporal motion vector predictor. Since the temporal reference block may correspond to the storage unit, the encoder and the decoder may derive the temporal motion information predictor from the prediction unit (for example, colPu) having the same motion information as the temporal reference block.

If the temporal motion vector predictor for the current block is derived, the encoder and the decoder may perform the inter prediction on the current block using the derived temporal motion vector predictor (S2340).

In the above-described embodiments, the methods are described based on the flowcharts as a series of steps or blocks. However, the present invention is not limited to the disclosed order of steps, and a certain step may occur simultaneously with or in an order different from that of other steps. Further, those of skilled in the art will be able to understand that steps shown in the flowchart are not exclusive, other steps can be included, or that one or more steps in the flowchart can be deleted without exerting an influence on the scope of the present invention.

The above-described embodiments include various types of examples. Although all possible combinations for presenting various types of examples are unable to be described, those of ordinary skill in the art will be able to recognize that other combinations are possible. Accordingly, the present invention can include all other substitutions, corrections, and modifications that belong to the following claims.

While the invention has been shown and described with reference to certain embodiments thereof, it will be understood by those skilled in the art that various changes in form and detail may be made therein without departing from the spirit and scope of the present invention, as defined by the appended claims.

The invention claimed is:

1. A method for deriving a temporal motion vector predictor to decode a picture by a decoding apparatus, comprising:
determining whether a first pixel belongs to a Largest Coding Unit (LCU) to which a collocated block belongs, wherein the first pixel neighbors the co-located block and is located at a lower right side of the co-located block, wherein the co-located block corresponds to a current block and is located in a reference picture;
determining a modified location in the reference picture;
determining a reference prediction unit (colPu), which is a prediction block encompassing the modified location;
deriving a temporal motion vector predictor (TMVP) for the current block from motion information of the determined reference prediction unit;
deriving a motion vector of the current block based on the TMVP;
generating a predicted pixel of the current block based on the motion vector; and
generating a reconstructed picture based on the predicted pixel,
wherein based on the first pixel not belonging to the LCU, the modified location is specified by a position ((xPCtr>>4)<<4, (yPCtr>>4)<<4), and wherein a position (xPCtr, yPCtr) is a position of a second pixel located at the bottom right side among four central pixels of the co-located block.

2. The method of claim 1, wherein the position specified by the first pixel is (xPRB, yPRB), wherein xPRB=xP+nPSW and yPRB=yP+nPSH, wherein (xP, yP) is a position of a top left sample of the current block, nPSW and nPSH are width and height of the current block, respectively.

3. The method of claim 1, wherein based on the first pixel not belonging to the LCU, the modified location is specified by a top-left sample position of a motion information storage unit block including the second pixel.

4. The method of claim 1, wherein, the position (xPCtr, yPCtr) is specified by xPCtr=xP+(nPSW>>1), yPCtr=yP+(nPSH<<1), a position (xP, yP) is a position of top left sample of the current block, and nPSW and nPSH are width and height of the current block respectively.

5. The method of claim 2, wherein based on yP and yPRB not being in the same LCU, the first pixel is determined as not belonging to the LCU to which the colocated block belongs.

6. A decoding apparatus, comprising:

a predictor configured to determine whether a first pixel belongs to a Largest Coding Unit (LCU) to which a co-located block belongs, wherein the first pixel neighbors the co-located block and located at a lower right side of the co-located block, wherein the co-located block corresponds to a current block and is located in a reference picture, to determine a modified location in the reference picture, determining a reference prediction unit (colPu), which is a prediction block encompassing the modified location, to derive a temporal motion vector predictor (TMVP) for the current block from motion information of the determined reference prediction unit, to derive a motion vector of the current block based on the TMVP, to generate a predicted pixel of the current block based on the motion vector, and to generate a reconstructed picture based on the predicted pixel; and a memory configured to store the reference picture, wherein based on the first pixel not belonging to the LCU, the modified location is specified by a position ((xPCtr>>4)<<4, (yPCtr>>4)<<4), and wherein a position (xPCtr, yPCtr) is a position of a second pixel located at the bottom right side among four central pixels of the co-located block.

7. The apparatus of claim 6, wherein the position (xPCtr, yPCtr) is specified by xPCtr=xP+(nPSW>>1), yPCtr=yP+(nPSH>>1), a position (xP, yP) is a position of top left sample of the current block, and nPSW and nPSH are width and height of the current block respectively.

8. The apparatus of claim 6, wherein the position specified by the first pixel is (xPRB, yPRB), wherein xPRB=xP+nPSW and yPRB=yP+nPSH, wherein (xP, yP) is a position of a top left sample of the current block, nPSW and nPSH are width and height of the current block, respectively.

9. The apparatus of claim 8, wherein based on yP and yPRB not being in the same LCU, the first pixel is determined as not belonging to the LCU to which the co-located block belongs.

10. The apparatus of claim 6, wherein based on the first pixel not belonging to the LCU, the modified location is specified by a top-left sample position of a second motion information storage unit block including the second pixel.

* * * * *